(12) United States Patent
Tsuchiya et al.

(10) Patent No.: US 8,951,036 B2
(45) Date of Patent: Feb. 10, 2015

(54) NECK CRYSTALLIZATION SYSTEM

(71) Applicant: Nissei ASB Machine Co., Ltd., Nagano (JP)

(72) Inventors: Yoichi Tsuchiya, Nagano (JP); Yuta Nishio, Nagano (JP)

(73) Assignee: Nissei ASB Machine Co., Ltd., Nagano (JP)

( * ) Notice: Subject to any disclaimer, the term of this patent is extended or adjusted under 35 U.S.C. 154(b) by 0 days.

(21) Appl. No.: 13/782,542

(22) Filed: Mar. 1, 2013

(65) Prior Publication Data

US 2013/0175738 A1    Jul. 11, 2013

Related U.S. Application Data

(63) Continuation of application No. PCT/JP2011/068415, filed on Aug. 12, 2011.

(30) Foreign Application Priority Data

Sep. 2, 2010    (JP) .................................. 2010-196781

(51) Int. Cl.
| | | |
|---|---|---|
| *B29C 49/68* | (2006.01) | |
| *B29C 71/00* | (2006.01) | |
| *B29C 35/08* | (2006.01) | |

(52) U.S. Cl.
CPC .............. *B29C 49/68* (2013.01); *B29C 71/0063* (2013.01); *B29K 2995/0041* (2013.01); *B29C 2035/0822* (2013.01)
USPC .......................................... 425/526; 425/534

(58) Field of Classification Search
USPC ................. 425/174.4, 526, 534; 264/908
See application file for complete search history.

(56) References Cited

U.S. PATENT DOCUMENTS

| | | | |
|---|---|---|---|
| 3,627,282 A | | 12/1971 | Kinslow, Jr. |
| 3,850,566 A | * | 11/1974 | Moore .......................... 425/526 |
| 6,562,281 B1 | | 5/2003 | Marchau et al. |
| 7,946,842 B2 | * | 5/2011 | Gillet ............................ 425/526 |

FOREIGN PATENT DOCUMENTS

| | | |
|---|---|---|
| FR | 2848495 | 6/2004 |
| GB | 1497114 | 1/1978 |
| JP | 50-44259 A | 4/1975 |
| JP | 07-032462 | 2/1995 |
| JP | 2001-510104 A | 7/2001 |
| JP | 2001-232677 | 8/2001 |

(Continued)

*Primary Examiner* — Robert B Davis
(74) *Attorney, Agent, or Firm* — David L. Hoffman; Hoffman Patent Group

(57) ABSTRACT

The neck crystallization system includes a rectangular stage, a plurality of sprockets that are disposed on the stage, and an endless member that is fitted around the plurality of sprockets. A transfer path that is formed in an area in which the endless member is disposed, includes first to fourth linear transfer paths. A plurality of heating sections provided along at least the first to third linear transfer paths, a cooling section disposed along at least the fourth linear transfer path, a molded article supply section that supplies the molded article at a position on the upstream side of the plurality of heating sections, and a molded article removal section that removes the molded article at a position between the cooling section and the molded article supply section, are provided along the transfer path in which a plurality of transfer members that respectively support the molded article are transferred.

13 Claims, 17 Drawing Sheets

(56) References Cited

FOREIGN PATENT DOCUMENTS

| JP | 2002-316353   | 10/2002 |
| JP | 2002-361720 A | 12/2002 |
| JP | 2004-299350   | 10/2004 |
| JP | 3842067       | 11/2006 |
| JP | 4266686       | 5/2009  |
| JP | 2012-071453   | 4/2012  |
| WO | 01-68338 A1   | 9/2001  |

* cited by examiner

NECK CRYSTALLIZATION SYSTEM

CROSS REFERENCE TO RELATED APPLICATIONS

This application is a continuation of International Patent Application No. PCT/JP2011/068415, having an international filing date of Aug. 12, 2011, which designated the United States and which claims priority from Japanese Patent Application No. 2010-196781 filed on Sep. 2, 2010, the entirety of each of the above international and Japanese applications being incorporated herein by reference.

BACKGROUND

1. Field of the Invention

The present invention relates to a neck crystallization system that is suitable for a wide-mouth container, and the like.

2. Description of the Related Art

A wide-mouth (wide-neck) container has a configuration in which the ratio of the outer diameter of the neck to the outer diameter of the body is larger than that of a narrow-mouth (narrow-neck) container (e.g., polyethylene terephthalate (PET) bottle) that is widely used as a beverage container. For example, a container having a neck outer diameter of 43 mm or more may be referred to as "wide-mouth container". The wide-mouth container has been widely used as a solid (e.g., jam) container in addition to a liquid container since it is easy to remove the contents from the wide-mouth container.

When the wide-mouth container is to be subjected to a high-temperature filling operation, it is necessary to increase the density of the neck through crystallization so that the neck exhibits heat resistance.

A system that crystallizes the neck of a molded article has been proposed. Japanese Patent No. 3842067 discloses technology that crystallizes the neck of a preform that is to be blow-molded, cools the neck using a cooling core that is inserted into the heated neck, and transfers the preform removed from a transfer member. Japanese Patent No. 4266686 discloses technology that attaches a shield member to a transfer member to prevent heat from a heater from being applied to an area other than the neck.

In both of the prior arts, the molded article that is subjected to neck crystallization is transferred along a track-like transfer path that includes two linear transfer paths that are parallel to the long side of a stage having a rectangular shape in a plan view, and is formed by fitting a chain around one drive sprocket and one driven sprocket. The heating section is disposed along the two linear transfer paths.

However, since the number of molded articles that can be disposed in the track-like transfer path, and the number of molded articles that are heated by the heating section decrease as the (neck) diameter of the molded article that is subjected to neck crystallization increases, it is necessary to increase the length of the long side of the stage. As a result, the system becomes elongated due to an increase in the ratio of the long side to the short side, and it is difficult to design the system layout within a factory where a plurality of systems are installed. Moreover, since the distance between the drive sprocket and the driven sprocket increases as the length of the long side increases, it is necessary to take measures for preventing deflection of the endless member (e.g., chain) that transfers the preform, for example.

In Japanese Patent No. 3842067, an area in which the heating section is disposed is provided along the linear transfer path by disposing the cooling section in an arc-like transfer path. However, since it is necessary to dispose at least the molded article supply section in the linear transfer path, the heating section placement space decreases correspondingly.

In FIG. 1 of Japanese Patent No. 4266686, the heating section placement space in the linear transfer path similarly decreases due to the presence of the molded article supply section and the like. In FIG. 1 of Japanese Patent No. 4266686 in which wide-mouth containers are arranged, the number of molded articles that can be subjected to neck crystallization further decreases as compared with FIG. 1 of Japanese Patent No. 3842067 in which narrow-mouth preforms are arranged. It is necessary to decrease the molded article transfer speed when the length of the heating zone is not increased. This results in a decrease in throughput of neck crystallization.

SUMMARY

Several aspects of the invention may provide a neck crystallization system that can reduce deflection of an endless member (e.g., chain) by suppressing an increase in the ratio of the long side to the short side of a stage, and can improve throughput by increasing the transfer speed, even when crystallizing the neck of a wide-mouth molded article.

Several aspects of the invention may provide a neck crystallization system that can smoothly supply a molded article by improving the positional accuracy of a transfer member secured on an endless member.

Several aspects of the invention may provide a neck crystallization system that thermally separates a molded article that is heated by a heating section from a transfer stage, and centers a molded article that is positioned away from the transfer stage.

Several aspects of the invention may provide a neck crystallization system that prevents deformation of a neck of a molded article during heating using a plurality of heating sections by inserting a core into the neck of the molded article, and suppresses undesirable deformation of the molded article that may occur when the molded article is heated in a state in which the core is inserted into the neck of the molded article.

Several aspects of the invention may provide a neck crystallization system that can detect supply failure in which a molded article supplied from a molded article supply section is not accurately placed on a transfer member, and can discharge an unsuccessfully supplied molded article from a transfer path.

Several aspects of the invention may provide a neck crystallization system that can resupply a new molded article to a transfer path in place of an unsuccessfully supplied molded article.

(1) According to one aspect of the invention, there is provided a neck crystallization system comprising:

a rectangular stage that has long sides and short sides in a plan view;

a plurality of sprockets that are disposed on the stage;

an endless member that is horizontally fitted around the plurality of sprockets;

a transfer path that is formed in an area in which the endless member is disposed, and includes first to fourth linear transfer paths, the first to fourth linear transfer paths being parallel to each other, and extending in a direction along the long sides, transfer directions of two transfer paths among the first to fourth linear transfer paths that are adjacent to each other in a direction along the short sides being opposite to each other;

a plurality of transfer members that are mounted on the endless member, and respectively support and transfer a molded article having a neck along the transfer path;

a plurality of heating sections that are provided along at least the first to third linear transfer paths among the first to fourth linear transfer paths that are positioned on an upstream side, and heat the neck of the molded article;

a cooling section that is disposed along at least the fourth linear transfer path that is positioned on a downstream side of the plurality of heating sections, and cools the neck of the molded article;

a molded article supply section that supplies at least one molded article to at least one transfer member that is situated in the transfer path at a position on an upstream side of the plurality of heating sections; and a molded article removal section that removes at least one molded article from at least one transfer member that is situated in the transfer path at a position between the cooling section and the molded article supply section.

According to one aspect of the invention, the total length of the transfer path that includes the first to fourth linear transfer paths that extend in the direction along the long sides of the stage can be increased as compared with prior art system (e.g., Japanese Patent No. 3842067 and Japanese Patent No. 4266686) even if the length of the long side of the stage is not changed. Moreover, since a plurality of heating sections can be disposed along at least the first to third linear transfer paths, the molded article can be sufficiently heated even if the transfer speed of the transfer member that supports the molded article is increased, so that the molded article can be subjected to neck crystallization with improved throughput using a single neck crystallization system. According to one aspect of the invention, since the total length of the transfer path can be increased as compared with prior art system, it is possible to transfer a larger number of wide-mouth preforms (e.g., preforms for forming a wide-mouth container). Moreover, since an increase in the ratio of the long side to the short side of the stage can be suppressed, deflection of the endless member can be suppressed due to engagement with a plurality of sprockets in spite of an increase in the total length of the endless member.

(2) In the neck crystallization system, the plurality of sprockets may include one drive sprocket and first to fourth driven sprockets, the drive sprocket may be disposed on an upstream-side end of the first linear transfer path, the first driven sprocket may be disposed on a downstream-side end of the first linear transfer path and an upstream-side end of the second linear transfer path, the second driven sprocket may be disposed on a downstream-side end of the second linear transfer path and an upstream-side end of the third linear transfer path, the third driven sprocket may be disposed on a downstream-side end of the third linear transfer path and an upstream-side end of the fourth linear transfer path, and the fourth driven sprocket may be disposed on a downstream-side end of the fourth linear transfer path.

According to the above layout, the first to fourth linear transfer paths can be formed using the five sprockets and the endless member, and a plurality of transfer members can be transferred using one of the five sprockets as the drive sprocket, and using the remainder of the five sprockets as the driven sprockets.

(3) In the neck crystallization system, the molded article supply section may supply the molded article to the transfer member that is secured on part of the endless member at a position at which part of the endless member engages the drive sprocket.

According to the above configuration, since the transfer member that receives the molded article is situated at a position at which the endless member engages the drive sprocket, the positional accuracy of the transfer member can be improved. In particular, the positional accuracy of the transfer member is high when the endless member that forms the long transfer path that includes the first to fourth linear transfer paths engages the drive sprocket, and is low when the endless member does not engage the drive sprocket. Therefore, the molded article can be smoothly supplied to the transfer path by transferring the molded article to the transfer member with high positional accuracy.

(4) In the neck crystallization system, the molded article supply section may include:

a first star wheel that is disposed concentrically with the drive sprocket, and rotates the molded article to transfer the molded article to the transfer member;

a second star wheel that transfers the molded article supplied from outside to the first star wheel; and a drive source that is shared by the drive sprocket, the first star wheel, and the second star wheel.

Since the first star wheel to which the molded article is transferred from the second star wheel can transfer the molded article to the transfer member that is secured on part of the endless member at a position at which part of the endless member engages the drive sprocket, the positional accuracy of the transfer member is improved. Moreover, since the first star wheel and the second star wheel share the drive source, synchronized rotation can be easily achieved.

(5) In the neck crystallization system, the stage may include a mounting section for selectively mounting at least one of the first to third driven sprockets at a different position in a direction parallel to the long sides.

This makes it possible to easily deal with a change in the length of the heating zone and the cooling zone of the neck crystallization system depending on the diameter of the neck of the molded article and the like.

(6) In the neck crystallization system, the molded article may include a body that follows the neck, a flange that separates the neck and the body, and a bottom that closes one end of the body, each of the plurality of transfer members may include:

an elevating rod;

a transfer stage that is supported by the endless member, the molded article being placed on the transfer stage in an inverted state in which the neck is positioned on a lower side;

a push-up member that pushes the molded article upward to move the neck away from the transfer stage in at least the plurality of heating sections and the cooling section in which the elevating rod is set to an elevated position;

a core that is disposed inside the neck of the molded article in at least the plurality of heating sections and the cooling section in which the elevating rod is set to the elevated position;

a first cam follower that is provided to the elevating rod; and a rotation sprocket that is provided to the elevating rod, and rotates the molded article in at least the plurality of heating sections in which the elevating rod is set to the elevated position, and the transfer path may include a first cam that guides the first cam follower, and a stationary chain that engages the rotation sprocket.

According to the transfer member, it is possible to transfer the molded article in the inverted state using the transfer stage, and thermally separate the molded article from the transfer stage by pushing the molded article upward using the push-up member in at least the plurality of heating sections and the cooling section. The core is inserted into the neck of the molded article in at least the plurality of heating sections and the cooling section. The neck of the molded article can be heated from the inside of the neck by allowing the core to reflect heat rays from the outside, or utilizing heat retained by the core, when heating the neck of the molded article (preform) that rotates in the heating section. The core also limits deformation of the neck that shrinks in the cooling section.

(7) In the neck crystallization system,
the body of the molded article may have a tapered inner circumferential wall that decreases in diameter toward the bottom, and
the push-up member may push the inner circumferential wall of the molded article upward.

The molded article that is transferred in the inverted state in which the neck is positioned on the lower side and the bottom is positioned on the upper side is pushed upward using the push-up member to separate the molded article from the transfer member. In this case, it is possible to thermally separate the molded article that is heated by the heating section from the transfer stage, and center the molded article that is positioned away from the transfer stage by allowing the push-up member to come in contact with the tapered inner circumferential wall of the molded article and push the tapered inner circumferential wall upward. This makes it possible to set the distance from the heating section to each molded article to be almost constant, and uniformly heat each molded article.

(8) In the neck crystallization system,
the first cam follower may be lowered using the first cam so that the core does not come in contact with the neck of the molded article in at least one non-heating zone between the plurality of heating sections.

According to the above configuration, it is possible to prevent or correct deformation of the neck of the molded article during heating using a plurality of heating sections by inserting the core into the neck of the molded article, and suppress undesirable deformation that mainly occurs in the body of the molded article when the molded article is heated in a state in which the core is continuously inserted into the neck of the molded article.

(9) In the neck crystallization system,
each of the plurality of transfer members may further include:
a tubular heat shield that is supported by an elevating member that can be moved upward and downward relative to the elevating rod, and surrounds the body of the molded article in at least the plurality of heating sections in which the elevating rod is set to the elevated position; and
a second cam follower that is connected to the heat shield, and
the transfer path may further include a second cam that guides the second cam follower.

It is possible to prevent the body from being heated in the heating section by surrounding the body of the molded article with the heat shield. In particular, since the heat shield can be moved upward and downward independently of the core and the push-up member, the core and the push-up member can be maintained in the elevated position while lowering the heat shield in the cooling section in which it is unnecessary to shield the body of the molded article from heat.

(10) The neck crystallization system may further comprise:
a core preheating section that is disposed along the transfer path at a position between the molded article removal section and the molded article supply section, and preheats the core of the plurality of transfer members.

According to the above configuration, since the core is exposed after the molded article removal section has removed the molded article, the core can be preheated using the core preheating section having a structure similar to that of the heating section. This makes it possible to efficiently heat the neck from the inside side and the outside side using a plurality of heating sections.

(11) The neck crystallization system may further comprise:
a detection section that detects placement failure of the molded article that is placed on the transfer stage of the transfer member by the first star wheel; and
a discharge section that is disposed along the transfer path on a downstream side of the detection section, and discharges the molded article for which placement failure has been detected by the detection section from the transfer path.

When the molded article is not normally placed on the transfer stage of the transfer member by the first star wheel (e.g., the molded article is supported in a tilted state), the supply failure is detected by the detection section. Since the discharge section that is positioned on the downstream side of the detection section discharges the molded article for which placement failure has been detected from the transfer path, it is possible to prevent an adverse effect of an unsuccessfully supplied molded article on the system.

(12) The neck crystallization system may further comprise:
a resupply section that resupplies a new molded article to the transfer member from which the molded article has been discharged by the discharge section at a position between the discharge section and the plurality of heating sections.

According to the above configuration, since an empty transfer member does not pass through the plurality of heating sections, it is possible to prevent a situation in which the exposed core of an empty transfer member is overheated by the heating section.

The resupply section may include a transfer arm that transfers a new molded article to the transfer member positioned in the transfer path, a circulation transfer section that circulates (transfers) the transfer arm at the same speed as the transfer speed of the transfer member, and a replenishment section that replenishes a new molded article to the transfer arm that is circulated by the circulation transfer section.

It is possible to deal with irregular supply failure by thus circulating (transferring) the transfer arm that holds the reserve molded article. Moreover, since the transfer arm is circulated at the same speed as the transfer member that is transferred continuously, it is possible to provide a time sufficient for the transfer member to receive and hold a new molded article.

The drive source may be shared by the circulation transfer section. This makes it possible to ensure synchronized drive for transferring the transfer member and the transfer arm at the same speed.

DESCRIPTION OF EXEMPLARY EMBODIMENTS

Exemplary embodiments of the invention are described in detail below. Note that the following exemplary embodiments do not in any way limit the scope of the invention defined by the claims laid out herein. Note also that all of the elements described in connection with the following exemplary embodiments should not necessarily be taken as essential elements of the invention.

1. First Embodiment 1.1. Outline of Neck Crystallization System

Figure 1:
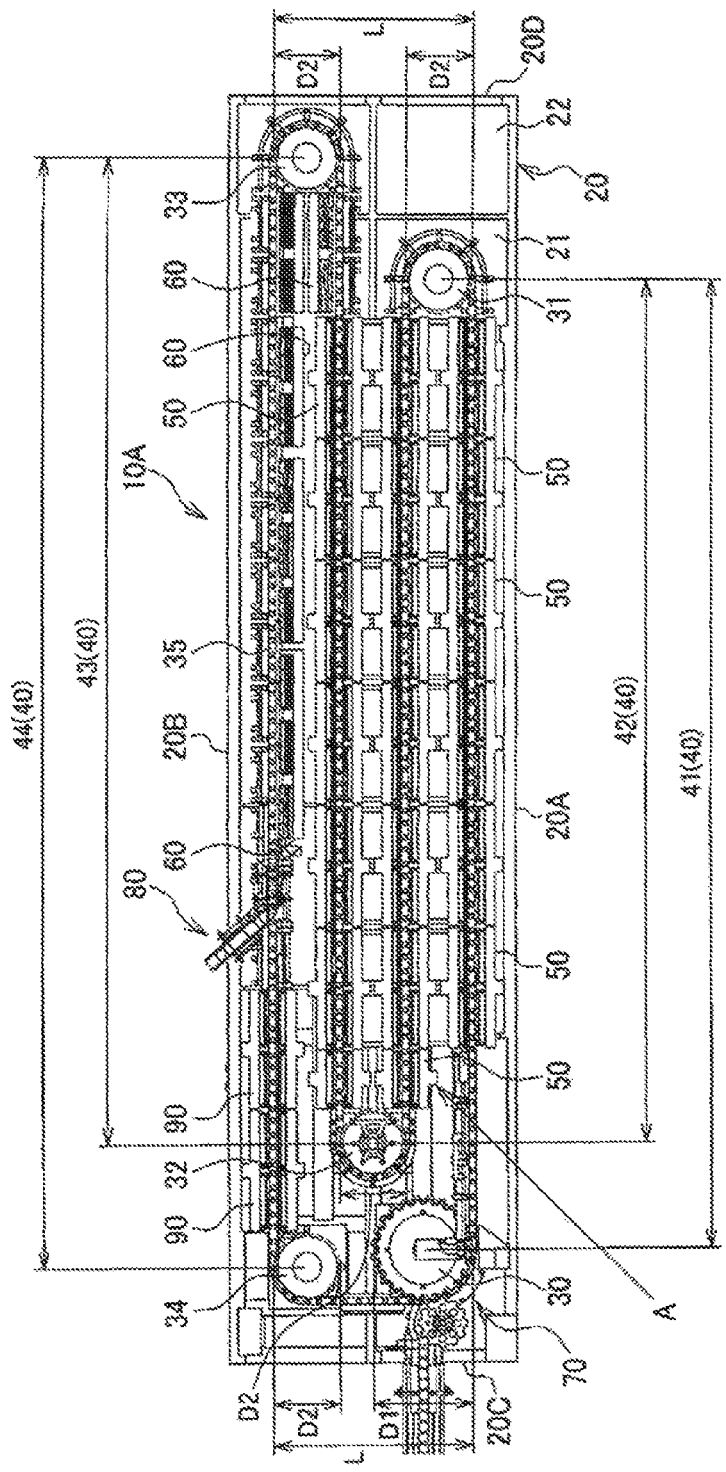
FIG. 1 is a plan view illustrating a neck crystallization system according to a first embodiment of the invention.

FIG. 1 is a plan view illustrating a neck crystallization system. As illustrated in FIG. 1, a neck crystallization system 10A includes a rectangular stage 20 that has long sides 20A and 20B and short sides 20C and 20D in a plan view (i.e., when viewed from above). A plurality of sprockets 30 to 34 are disposed on the stage 20. In the first embodiment, a drive sprocket 30 and first to fourth driven sprockets 31 to 34 are provided as the plurality of sprockets 30 to 34. A drive chain 35 (i.e., endless member) is horizontally fitted around the drive sprocket 30 and the first to fourth driven sprockets 31 to 34.

A transfer path 40 that includes first to fourth linear transfer paths 41 to 44 is provided in an area in which the drive chain 35 is disposed. The first to fourth linear transfer paths 41 to 44 are parallel to each other, and extend in the direction along the long sides 20A and 20B. The transfer directions of two transfer paths among the first to fourth linear transfer paths 41 to 44 that are adjacent to each other in the direction along the short sides 20C and 20D are opposite to each other. A transfer member 100 (not illustrated in FIG. 1) (see FIGS. 2 to 4) is supported by the drive chain 35, and circulated (transferred) along the transfer path 40 in a state in which the transfer member 100 supports a molded article such as a preform.

A plurality of heating sections 50 are provided along at least the first to third linear transfer paths 41 to 43 among the first to fourth linear transfer paths 41 to 44 that are positioned on the upstream side. A plurality of cooling sections 60 are provided along the third and fourth linear transfer paths 43 and 44 that are positioned on the downstream side of the area in which the plurality of heating sections 50 are disposed.

A molded article supply section 70 that supplies a molded article is provided in the transfer path 40 on the upstream side of the plurality of heating sections 50. A molded article removal section 80 is provided in the transfer path 40 at a position between the plurality of cooling sections 60 and the molded article supply section 70. In the first embodiment, a core preheating section 90 is provided in the fourth linear transfer path 44 on the downstream side of the molded article removal section 80.

Since the neck crystallization system 10A includes the transfer path 40 that includes the first to fourth linear transfer paths 41 to 44 that extend in the direction along the long sides 20A and 20B, the total length of the transfer path 40 of the neck crystallization system 10A can be easily increased as compared with prior art neck crystallization system. Since a plurality of heating sections 50 can be disposed along at least the first to third linear transfer paths 41 to 43, the molded article can be sufficiently heated even if the transfer speed of the transfer member 100 (see FIGS. 2 to 4) that supports the molded article is increased, so that the molded article can be subjected to neck crystallization with improved throughput using a single neck crystallization system 10A. Since the total length of the transfer path 40 of the neck crystallization system 10A can be increased as compared with prior art neck crystallization system, it is possible to transfer a larger number of wide-mouth preforms (e.g., preforms for forming a wide-mouth container).

The drive sprocket 30 is disposed on the upstream-side end of the first linear transfer path 41. The first driven sprocket 31 is disposed on the downstream-side end of the first linear transfer path 41 and the upstream-side end of the second linear transfer path 42. The second driven sprocket 32 is disposed on the downstream-side end of the second linear transfer path 42 and the upstream-side end of the third linear transfer path 43. The third driven sprocket 33 is disposed on the downstream-side end of the third linear transfer path 43 and the upstream-side end of the fourth linear transfer path 44. The fourth driven sprocket 34 is disposed on the downstream-side end of the fourth linear transfer path 44.

As illustrated in FIG. 1, the first to third driven sprockets 31 to 33 have an identical outer diameter D2. Therefore, the first to fourth linear transfer paths 41 to 44 can be disposed at equal intervals in the direction along the short sides 20C and 20D. In this case, the distance L between the first linear transfer path 41 and the fourth linear transfer path 44 is approximately equal to 3×D2. Specifically, it is necessary to dispose the first to third driven sprockets 31 to 33 within the distance L between the first linear transfer path 41 and the fourth linear transfer path 44. The drive sprocket 30 and the fourth driven sprocket 34 are disposed along the short side 20C of the stage 20. Therefore, even if the outer diameter of the fourth driven sprocket 34 is equal to the outer diameter D2 of the first to third driven sprockets 31 to 33, there is a sufficient space for arbitrarily setting the outer diameter D1 of the drive sprocket 30. Specifically, the outer diameter D1 of the drive sprocket 30 can be set to be smaller than, equal to, or larger than the outer diameter D2 of the first to third driven sprockets 31 to 33 (i.e., D1<D2, D1=D2, or D1>D2). Note that the outer diameter of the fourth driven sprocket 34 need not be identical with the outer diameter D2 of the first to third driven sprockets 31 to 33. The outer diameter of the fourth driven sprocket 34 may be set to be smaller than or larger than the outer diameter D2 of the first to third driven sprockets 31 to 33.

In the first embodiment, the outer diameter D1 of the drive sprocket 30 is set to be larger than the outer diameter D2 of the first to third driven sprockets 31 to 33, for example. This makes it possible to increase the number of teeth of the drive sprocket 30 that simultaneously engage the drive chain 35. Therefore, the drive chain 35 can be easily driven in a stable manner using only one drive sprocket 30.

The details of the neck crystallization system 10A are described below. The detailed structure described below is suitable for the neck crystallization system 10A illustrated in FIG. 1, but need not necessarily be applied to a neck crystallization system that includes the first to fourth linear transfer paths 41 to 44. The detailed structure described below may also be applied to a neck crystallization system in which a transfer path is formed by fitting the endless member around one drive sprocket and at least one driven sprocket. Specifically, the detailed structure described below may be applied to a neck crystallization system in which a track-like transfer path is formed by fitting a chain around one drive sprocket and one driven sprocket (see Japanese Patent No. 3842067 and Japanese Patent No. 4266686).

1.2. Transfer Member

Figure 2:
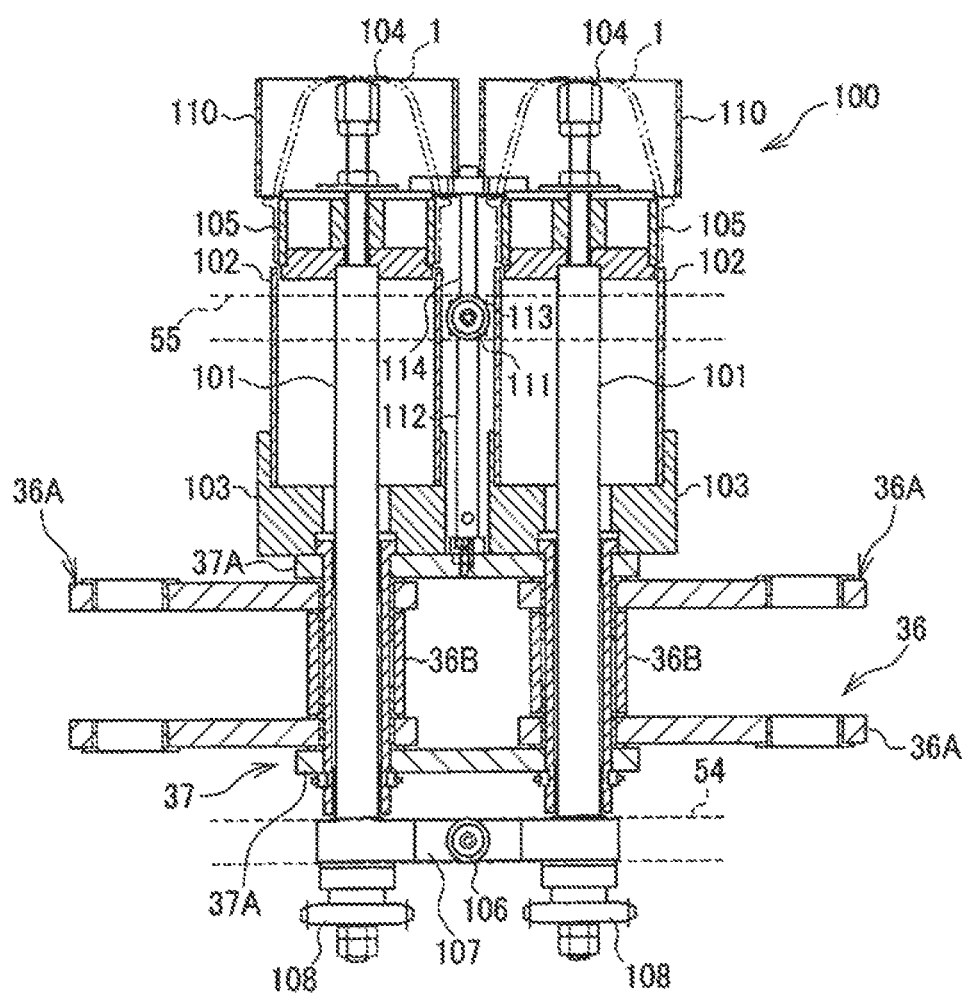
FIG. 2 is a front view illustrating a transfer member that is transferred along a transfer path of the neck crystallization system illustrated in FIG. 1.
Figure 3:
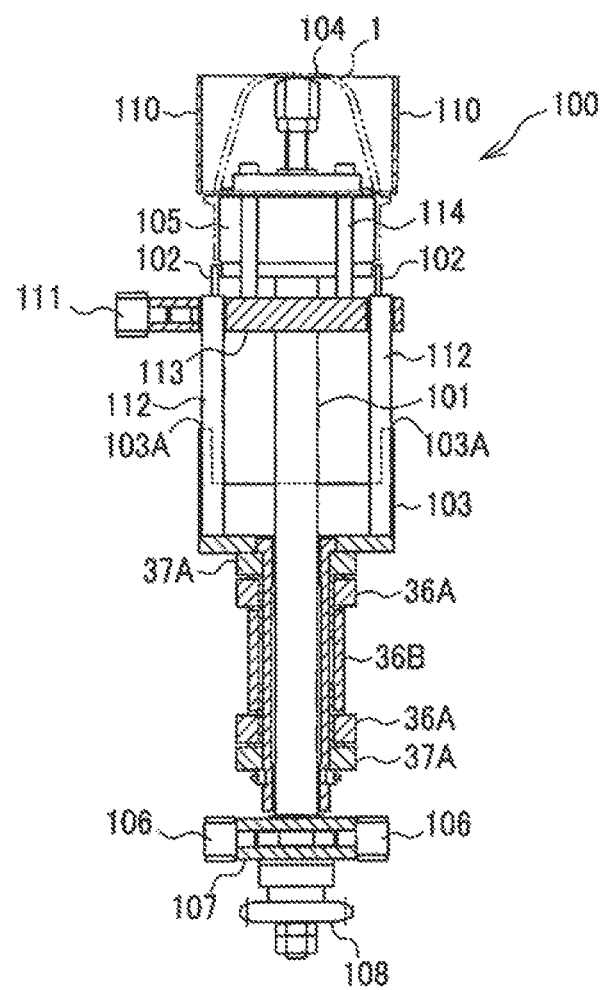
FIG. 3 is a side view illustrating the transfer member illustrated in FIG. 2.
Figure 4:
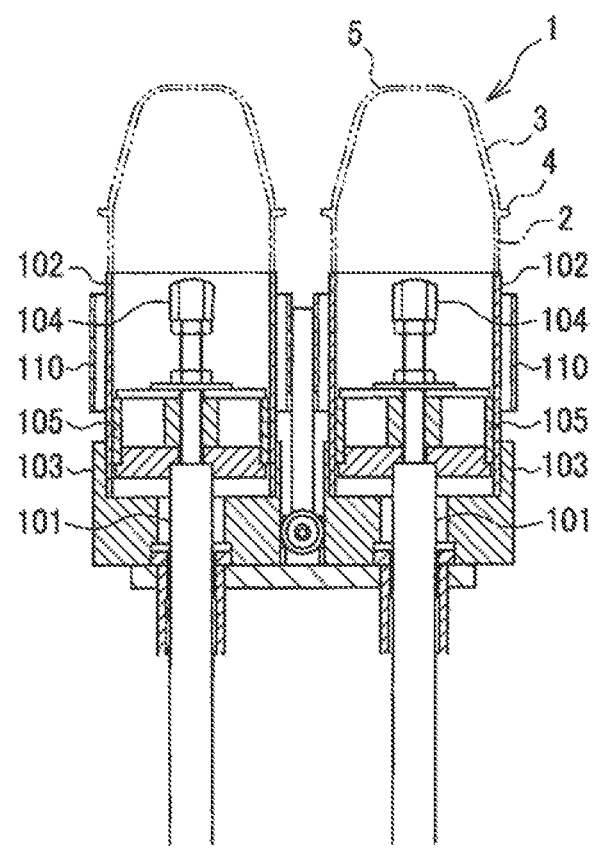
FIG. 4 is a front view illustrating the transfer member that is set in a state differing from that illustrated in FIGS. 2 and 3.

FIG. 2 is a front view illustrating the transfer member, and FIG. 3 is a side view illustrating the transfer member. FIG. 4 is a partial front view illustrating the transfer member that is set in a state differing from that illustrated in FIGS. 2 and 3. The drive chain 35 on which the transfer member 100 is secured, includes a plurality of inner links 36 that respectively support a roller 36B between two inner plates 36A, and a plurality of outer links 37 that respectively link two adjacent inner links 36 so that the inner links 36 are positioned between two outer plates 37A.

As illustrated in FIG. 4, a preform 1 (e.g., a preform for forming a wide-mouth container) that is supported by the transfer member 100 includes a neck 2, a body 3 that follows the neck 2, a flange 4 that is formed between (i.e., separates) the neck 2 and the body 3, and a bottom 5 that closes one end of the body 3. The preform 1 is supported by the transfer member 100 in an inverted state (i.e., a state in which the neck 2 is positioned on the lower side).

The transfer member 100 that supports the preform 1 includes an elevating rod 101. The elevating rod 101 is inserted into and supported by the roller 36B of the drive chain 35 so that the elevating rod 101 can move upward and downward.

The transfer member 100 includes a transfer stage 102 that is supported by the drive chain 35, the preform 1 being placed on the transfer stage 102 in the inverted state. The neck 2 of the preform 1 is placed on the upper end of the transfer stage 102 having a tubular shape, for example (see FIG. 4). The transfer stage 102 is supported by two bases 103 that are secured on the outer plate 37A of the drive chain 35, for example.

The transfer member 100 includes a push-up member 104 that pushes the bottom 5 of the preform 1 upward to move the neck 2 away from the transfer stage 102 when the elevating rod 101 is set to the elevated position illustrated in FIGS. 2 and 3. The neck 2 is thus thermally separated from the transfer stage 102.

The transfer member 100 also includes a core 105 that is disposed inside the neck 2 of the preform 1 when the elevating rod 101 is set to the elevated position illustrated in FIGS. 2 and 3.

The transfer member 100 includes a first cam follower 106 that is secured on the elevating rod 101, and is used to move the elevating rod 101 upward and downward. In the first embodiment, two adjacent transfer members 100 share one first cam follower 106 (see FIG. 2). The first cam follower 106 is provided on each end of a horizontal section 107 that perpendicularly intersects the transfer direction that is vertical to the sheet (see FIG. 3) in the horizontal direction.

The push-up member 104 and the core 105 can be maintained at the elevated position by guiding the first cam follower 106 using a first cam 54 (see FIG. 6) that is schematically illustrated in FIG. 2, or can be moved between the elevated position and the lowered position by tilting the first cam 54.

The transfer member 100 also includes a rotation sprocket 108 that is provided at the lower end of the elevating rod 101, for example. The rotation sprocket 108 rotates the preform 1 around the vertical axis thereof.

The transfer member 100 having the above structure may further include a tubular heat shield 110 that surrounds the body 3 of the preform 1, and a second cam follower 111 that is connected to the heat shield 110. Note that the transfer member 100 need not necessarily include the heat shield 110 and the second cam follower 111. Specifically, it is unnecessary to shield the body 3 of the preform 1 from heat if the quantity of heat is small when a heater 51 (described later) heats the body 3 of the preform 1. As illustrated in FIG. 3, the heat shield 110 and the second cam follower 111 are secured on an elevating member 113 that is guided along a guide shaft 112, the lower end of the guide shaft 112 is secured on the outer plate 37A of the drive chain 35, for example. The heat shield 110 is secured on a shaft 114 that extends upward from the elevating member 113. The heat shield 110 can be maintained at the elevated position by guiding the second cam follower 111 using a second cam 55 (see FIG. 6) that is schematically illustrated in FIG. 2, or can be moved between the elevated position and the lowered position by tilting the second cam 55. The heat shield 110 can be moved independently of the push-up member 104 and the core 105. Note that a stopper 103A that limits the lower-limit position of the elevating member 113 is formed in the base 103 (see FIG. 3).

1.3. Molded Article Supply Section

Figure 5:
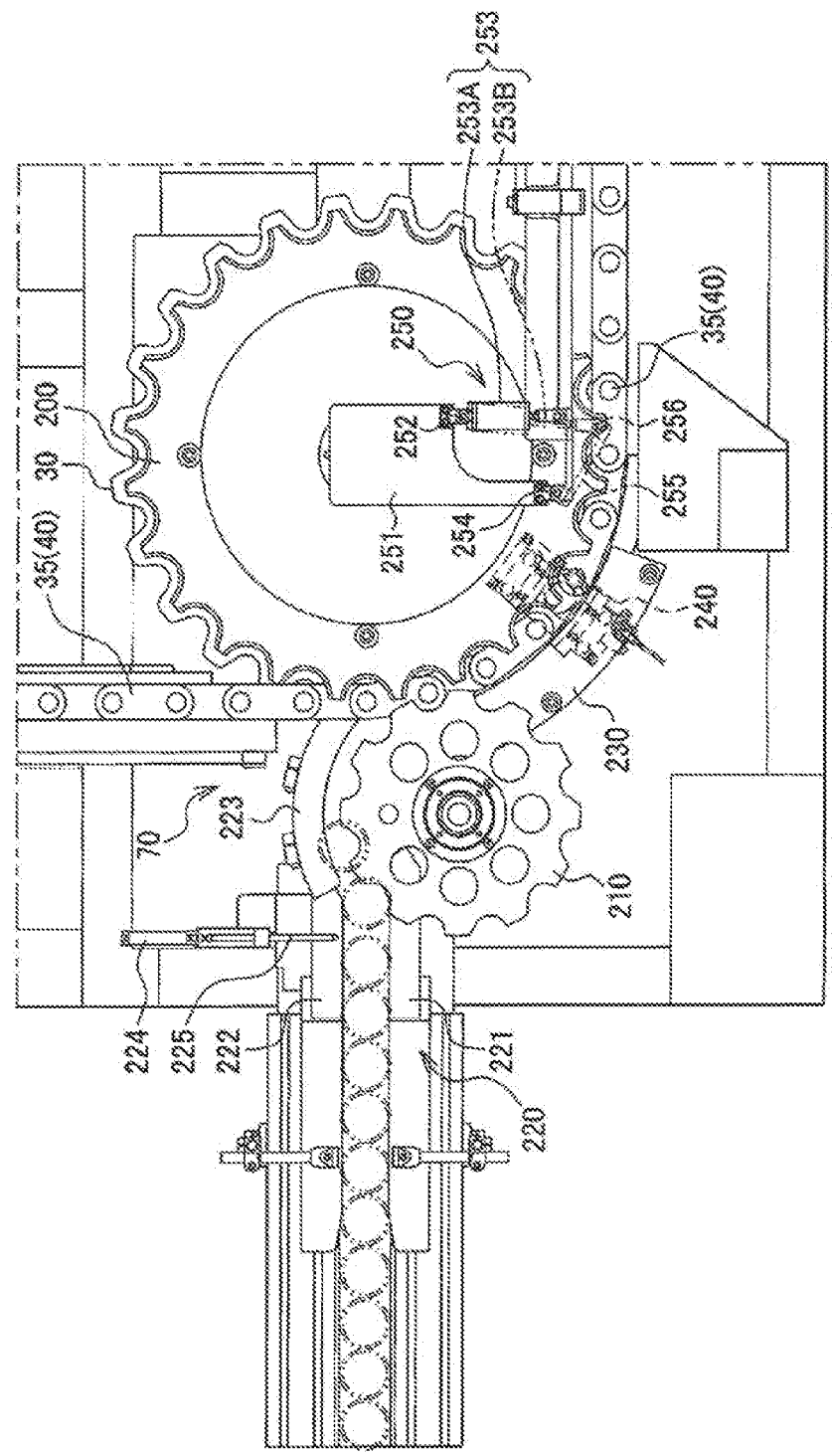
FIG. 5 is a plan view illustrating a molded article supply section, a detection section, and a discharge section.

The molded article supply section 70 illustrated in FIG. 1 is described below with reference to FIG. 5. As illustrated in FIG. 5, the molded article supply section 70 supplies the preform 1 to the transfer member 100 (omitted in FIG. 5) that is secured on part of the drive chain 35 at a position at which part of the drive chain 35 engages the drive sprocket 30, for example.

As illustrated in FIG. 5, the molded article supply section 70 may include a first star wheel 200 and a second star wheel 210. The first star wheel 200 is disposed concentrically with the drive sprocket 30 (see FIG. 1), and transfers (rotates) the preform 1 along the transfer path 40 (i.e., the path of the drive chain 35) while supporting the flange 4. The second star wheel 210 transfers (rotates) the preform 1 supplied from the outside to the first star wheel 200. The first star wheel 200 and the second star wheel 210 receive the preform 1 in a semicircular depression that is formed along the outer periphery of the first star wheel 200 and the second star wheel 210, and transfers (guides) the preform 1. The first star wheel 200 and the second star wheel 210 are rotated at the same speed as the drive chain 35 in synchronization with the drive chain 35. The details of the rotation system for the first star wheel 200 and the second star wheel 210 are described later in connection with a second embodiment.

A guide passage 220 that guides the preform 1 to the second star wheel 210 includes a first linear guide 221, a second linear guide 222, and a first arc-like guide 223. The first linear guide 221, the second linear guide 222, and the first arc-like guide 223 may include a groove (mounting section)

that guides the flange 4 of the preform 1. The first linear guide 221 and the second linear guide 222 are disposed opposite to each other on either side of the path in which the preform 1 is transferred. The first arc-like guide 223 is formed concentrically with the second star wheel 210, and is disposed on the outer side of the second star wheel 210. The first arc-like guide 223 transfers (guides) the preform 1 to the first star wheel 200 in cooperation with the second star wheel 210.

A stopper pin 225 that is caused to advance and retract using an air cylinder 224 is provided as a stop member that stops the preform 1 that passes through the space between the first linear guide 221 and the second linear guide 222. The supply of the preform 1 is stopped using the stopper pin 225 when stopping the operation of the neck crystallization system 10A, for example.

The transfer member 100 (omitted in FIG. 5) that is secured on and transferred by the drive chain 35 is set to the state illustrated in FIG. 4 when the transfer member 100 passes through the molded article supply section 70. Specifically, the push-up member 104, the core 105, and the heat shield 110 are lowered when the transfer member 100 passes through the molded article supply section 70. Therefore, the end face of the neck 2 of the preform 1 can be placed on the transfer stage 102 illustrated in FIG. 4. Accordingly, when the preform 1 is transferred to the first star wheel 200, the end face of the neck 2 can be placed on the transfer stage 102 of the transfer member 100. The preform 1 is transferred in a state in which the preform 1 is placed on the transfer stage 102 of the transfer member 100, and is guided by the first star wheel 200 that moves at the same speed as the transfer member 100.

The molded article supply section 70 further includes a second arc-like guide 230 that is formed concentrically with the first star wheel 200, and is disposed on the outer side of the first star wheel 200. The second arc-like guide 230 guides the preform 1 so that the neck 2 of the preform 1 that has been transferred to the first star wheel 200 does not fall off from the transfer stage 102 of the transfer member 100.

The molded article supply section 70 supplies the preform 1 to the transfer member 100 (omitted in FIG. 5) that is secured on part of the drive chain 35 at a position at which part of the drive chain 35 engages the drive sprocket 30. According to the above configuration, since the transfer member 100 that receives the preform 1 is situated at a position at which the drive chain 35 engages the drive sprocket 30, the positional accuracy of the transfer member 100 can be improved. In particular, the positional accuracy of the transfer member 100 is high when the drive chain 35 that forms the long transfer path 40 that includes the first to fourth linear transfer paths 41 to 44 (see FIG. 1) engages the drive sprocket 30, and is low when the drive chain 35 does not engage the drive sprocket 30. The preform 1 can be smoothly supplied to the transfer path 40 by transferring the preform 1 to the transfer member 100 with high positional accuracy.

Moreover, since the molded article supply section 70 need not be disposed in the first linear transfer path 41, the entire first linear transfer path 41 can be effectively utilized as compared with Japanese Patent No. 3842067 and Japanese Patent No. 4266686. For example, the number of heating sections 50 disposed along the first linear transfer path 41 can be increased by employing the above configuration.

Note that a detection section 240 that detects supply failure of the preform 1, a discharge section 250 that discharges an unsuccessfully supplied preform 1 from the system, and the like may optionally be provided (see FIG. 5). The details of the detection section 240 and the discharge section 250 are described later in connection with the second embodiment.

1.4. Heating Section

Figure 6:
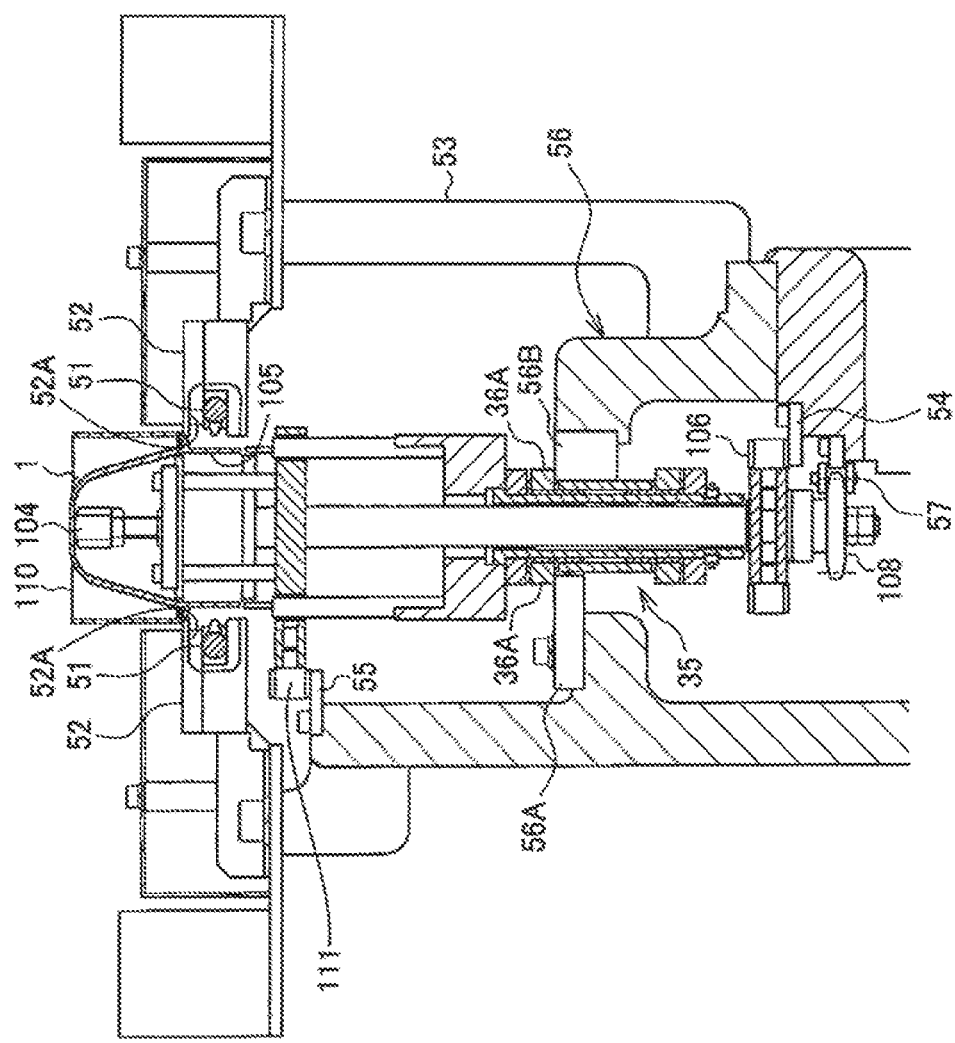
FIG. 6 is a cross-sectional view illustrating a heating section.

The heating sections 50 illustrated in FIG. 1 are unitized to have a given length in the direction along the first to third linear transfer paths 41 to 43. As illustrated in FIG. 6, the heating section 50 includes a heater 51 that is provided on each side of the transfer path in which the neck 2 of the preform 1 is transferred. The heater 51 may be a rod-like infrared heater that is disposed parallel to the transfer path 40 (first to third linear transfer paths 41 to 43) in which the preform 1 is transferred. The heater 51 is supported by a support block 52 that also serves as a reflector. A recess 52A is formed in the opposite end of two opposite support blocks 52, and the heater 51 is disposed in the recess 52A.

The heating section 50 includes a support frame 53 that holds the two support blocks 52 and the like. The support blocks 52 are secured on the upper part of the support frame 53. The support frame 53 includes the first cam 54 that guides the first cam follower 106 of the transfer member 100 at the elevated position, and the second cam 55 that guides the second cam follower 111 of the transfer member 100 at the elevated position. The preform 1 can thus be transferred in the heating section 50 while maintaining the push-up member 104, the core 105, and the heat shield 110 of the transfer member 100 in the elevated position.

The support frame 53 of the heating section 50 may further include a chain guide 56. The chain guide 56 is used to correct the height of the drive chain 35. The chain guide 56 includes guide sections 56A and 56B that are provided on either side of the drive chain 35 and support the lower side of the inner plate 36A of the drive chain 35, for example. The guide sections 56A and 56B are secured on the support frame 53. This makes it possible to improve the accuracy of the height of the neck 2 of the preform 1, and allow the neck 2 to face the two heaters 51, so that the entire neck 2 can be heated.

The heating section 50 is configured so that the core 105 is inserted into the neck 2 of the preform 1. The core 105 may be formed by disposing an outer layer that is formed of a material having either or both of an infrared absorption function and an infrared reflection function on the circumferential surface of an insulator, for example. The outer layer is formed of a metal, for example. In the first embodiment, the outer layer is formed of stainless steel (SUS). Specifically, the core 105 does not have a heat source, and heats the neck 2 from the inner side by reflecting heat rays (infrared rays) from the heater 51, or utilizing heat retained by the core 105. In particular, the internal heating efficiency using the core 105 is improved when preheating the core 105 using the core preheating section 90 illustrated in FIG. 1. Note that the core preheating section 90 need not necessarily be provided. The difference in temperature between the inner side and the outer side of the neck 2 can be reduced while reducing the crystallization time by combining internal heating using the core 105 and external heating using the heater 51. Moreover, since the core 105 that is transferred together with the preform 1 need not have a heat source, the system does not become complex.

The heating section 50 is configured so that the body 3 of the preform 1 is surrounded by the tubular heat shield 110. A situation in which heat is transferred to the body 3 can be prevented by providing the heat shield 110. Note that the heat shield 110 is set to the elevated position before the preform 1 is supplied to the heating section 50, and is lowered after the preform 1 has passed through each heating section 50. Therefore, the heat shield 110 is set to the elevated position or the lowered position so that the heat shield 110 does not interfere with the heater 51 and the support block 52.

The heating section 50 is configured so that the preform 1 is rotated in order to uniformly heat the neck 2 of the preform 1 in the circumferential direction. The support frame 53 of the heating section 50 supports a chain 57 that engages the rotation sprocket 108 of the transfer member 100 in order to rotate the preform 1. The chain 57 may be a stationary chain that is secured on the support frame 53. The rotation sprocket 108 that engages the stationary chain 57 rotates when the transfer member 100 is transferred by the drive chain 35. The preform 1 can be rotated by thus rotating the elevating rod 101, the push-up member 104, and the core 105. It is unnecessary to dispose a driven member in the heating section 50 as a result of utilizing the stationary chain 57. Moreover, the rotational speed of the preform 1 with respect to the unit transfer distance of the transfer member 100 can be increased by reducing the diameter of the rotation sprocket 108, so that the neck 2 can be uniformly heated in the circumferential direction.

It is possible to heat the neck 2 of the preform 1 having a large diameter from room temperature to the crystallization temperature by disposing a number of heating sections 50 having the above structure along the first to third linear transfer paths 41 to 43 illustrated in FIG. 1. The neck 2 of the preform 1 is thus crystallized.

Note that the heating section 50 is not disposed along the arc-like transfer path along which the first driven sprocket 31 and the second driven sprocket 32 are disposed (see FIG. 1). This is because it is difficult to curve the heater 51. The non-heating zone in which the heating section 50 is not disposed is used as a temperature gradient reduction zone that reduces the temperature gradient between the inner wall and the outer wall of the neck 2 of the preform 1.

1.5. Cooling Section

The cooling section 60 illustrated in FIG. 1 cools the neck 2 that has been heated at the crystallization temperature. The cooling section 60 is configured so that the preform 1 is transferred in the state illustrated in FIGS. 2 and 3. Note that the heat shield 110 may be lowered in the cooling section 60. The cross section of the cooling section 60 is omitted in the drawings. The cooling section 60 includes a support frame similar to the support frame 53 of the heating section 50 as shown in FIG. 6). Specifically, the neck 2 of the preform 1 is cooled in a state in which at least the core 105 is inserted into the neck 2. The core 105 prevents (restricts) shrinkage (deformation) of the neck 2 during the cooling step. The cooling step may be implemented by air cooling while rotating the preform 1, or may be implemented by forced cooling using a refrigerant. In the first embodiment, the cooling section 60 includes a cooling fan (not illustrated in the drawings), and subjects the neck 2 to forced air cooling. A plurality of cooling sections 60 are unitized on a cooling fan basis, and are provided along the downstream region of the third linear transfer path 43 and the upstream region of the fourth linear transfer path 44 (see FIG. 1). A situation in which the neck 2 of the preform 1 is thermally deformed after removal is prevented (i.e., stable dimensional accuracy is obtained) by cooling the neck 2 using the cooling section 60.

1.6. Molded Article Removal Section

Figure 7:
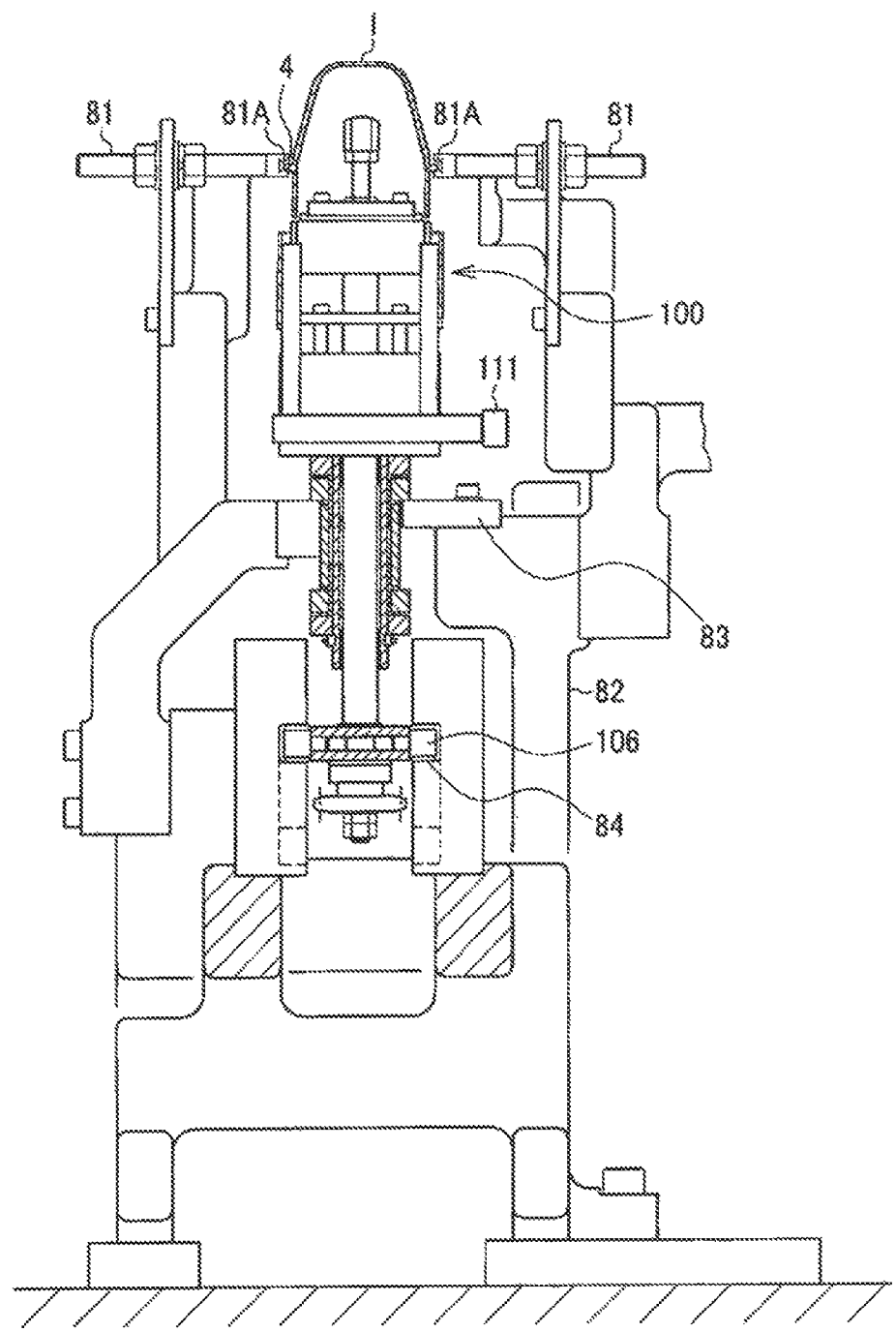
FIG. 7 is a cross-sectional view illustrating a molded article removal section.

As illustrated in FIG. 7, the molded article removal section 80 illustrated in FIG. 1 includes a pair of removal guides 81 that are provided on either side of the transfer path along which the preform 1 is transferred. A guide groove 81A that guides the flange 4 of the preform 1 is formed in the opposite end of the pair of removal guides 81.

The molded article removal section 80 includes a support frame 82 that supports the pair of removal guides 81. The support frame 82 includes a chain guide 83 similar to the chain guide 56 illustrated in FIG. 6, and includes a first cam 84 that guides the first cam follower 106 of the transfer member 100.

The first cam 84 differs in height depending on the position as indicated by the solid line and the broken line in FIG. 7. The height of the cam surface of the first cam 84 decreases as the transfer member 100 moves downstream. In FIG. 7, the push-up member 104 and the core 105 are positioned lower than the upper-limit position, and are lowered to the lower-limit position due to the first cam 84. Specifically, the push-up member 104 and the core 105 in illustrated in FIG. 7 are set to the same state illustrated in FIG. 4, and the preform 1 is placed on the transfer stage 102.

As illustrated in FIG. 1, the pair of removal guides 81 are curved outward in the downstream direction to diverge from the transfer path 40. Therefore, the preform 1 is removed from the transfer path 40, and transferred to the outside of the system along the shape of the pair of removal guides 81 that guide the flange 4 of the preform 1 placed on the transfer stage 102 of the transfer member 100. The molded article removal section 80 can thus remove the preform 1 without using power except for the drive chain 35.

1.7. Core Preheating Section

The core preheating section 90 that may optionally be provided may have a structure similar to that of the heating section 50 illustrated in FIG. 6. The preform 1 is not placed on the transfer member 100 when the transfer member 100 passes through the core preheating section 90. Therefore, the heater 51 can directly heat the core 105, and the core 105 can be preliminarily heated before the core 105 is inserted into the neck 2 of the preform 1. Note that the heat shield 110 may be lowered in the core preheating section 90, differing from FIG. 6. This is because it is unnecessary to shield heat since the preform 1 is not present, and the heat shield 110 has been lowered in the molded article removal section 80 provided on the upstream side of the core preheating section 90. Moreover, it is necessary to lower the heat shield 110 in the molded article supply section 70 through which the transfer member 100 passes subsequently to the core preheating section 90 since the heat shield 110 hinders the supply of the preform 1. Therefore, the heat shield 110 is lowered in the first embodiment when the transfer member 100 passes through the molded article removal section 80, the core preheating section 90, and the molded article supply section 70.

2. Second Embodiment

The second embodiment relates to a neck crystallization system 10B that includes the detection section 240 illustrated in FIGS. 5 and 8, the discharge section 250 illustrated in FIGS. 5 and 9, and a molded article resupply section 400 illustrated in FIGS. 9 to 11 in addition to the elements described in connection with the first embodiment.

2.1. Supply Failure Detection Section

In the second embodiment, an additional structure that provides for supply failure of the preform 1 may optionally be provided. As illustrated in FIG. 5, the neck crystallization system 10B may include the detection section 240 that detects placement failure (supply failure) of the preform 1 that is placed on the transfer stage 102 of the transfer member 100 using the first star wheel 200.

Since an unsuccessfully supplied preform 1 may interfere with another member in the heating section 50 or the like of the neck crystallization system 10B, and may make it necessary to stop the operation of the neck crystallization system 10B, such a preform 1 is removed on the upstream side of the heating section 50.

Figure 8:
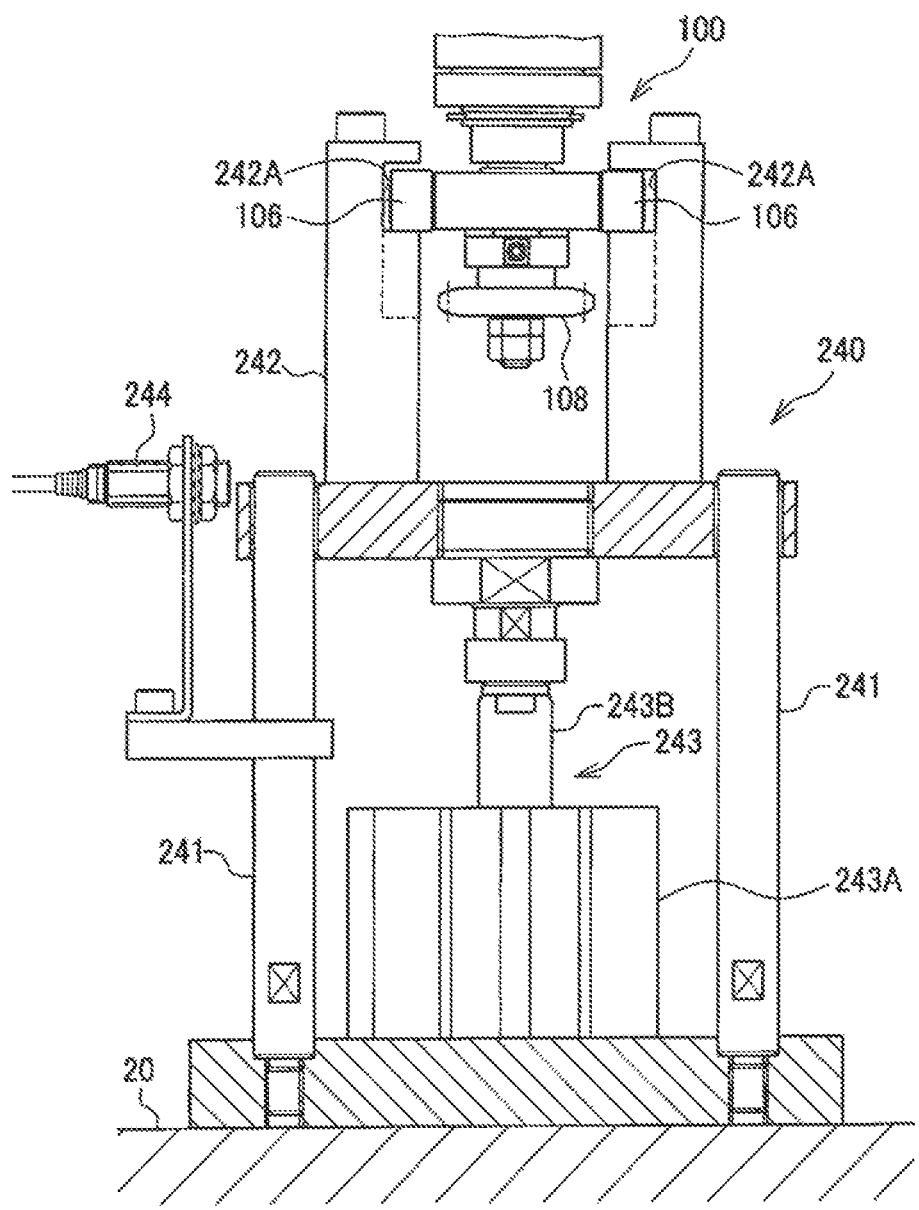
FIG. 8 is a view illustrating the details of a detection section illustrated in FIG. 5.

As illustrated in FIG. 8, the detection section 240 includes an elevating member 242 that is supported by a plurality of guide rods 241 that are secured on the stage 20 so that the elevating member 242 can move upward and downward. An engagement groove 242A that engages the first cam follower 106 of the transfer member 100 is formed in the elevating member 242. Therefore, the push-up member 104 and the core 105 (see FIGS. 2 to 4) are moved upward and downward through the first cam follower 106 when the elevating member 242 is moved upward and downward.

The detection section 240 also includes an air cylinder 243 that is secured on the stage 20. The upper end of a rod 243B that advances and retracts relative to a cylinder 243A secured on the stage 20 is secured on the elevating member 242. The air cylinder 243 is driven at a relatively low air pressure.

The detection section 240 also includes a sensor 244 that detects whether or not the elevating member 242 is positioned at a given height. The sensor 244 is fixed at a given height using the guide rod 241, for example. It is preferable that the sensor 244 be a contactless sensor. For example, a sensor that causes a change in capacitance between the elevating member 242 made of a metal and the sensor 244 may be used. The sensor 244 may be another contactless sensor that utilizes light or the like, or may be a contact sensor.

The detection section 240 detects an unsuccessfully supplied preform 1 based on the following principle. The first cam follower 106 of the transfer member 100 that passes over the detection section 240 engages the engagement groove 242A. In this case, the elevating member 242 having the engagement groove 242A is moved upward to the upper-limit position using the air cylinder 243. The push-up member 104 and the core 105 (see FIGS. 2 to 4) are thus moved upward and downward. When the preform 1 is set to the normal inverted state in which the end face of the neck 2 is horizontal (see FIGS. 2 and 3), the core 105 and the push-up member 104 can move upward without colliding with the neck 2 of the preform 1. Therefore, the push-up member 104 and the core 105 are set at the normal elevated position illustrated in FIG. 4. It is determined that supply failure has not occurred when the elevating member 242 set at the normal elevated position has been detected by the sensor 244. Note that the first cam follower 106 of the transfer member 100 on which a normally supplied preform 1 is placed is guided by the first cam 54 illustrated in FIG. 2, so that the elevated position of the push-up member 104 and the core 105 is maintained.

If the preform 1 is tilted, the core 105 cannot be inserted into the neck 2 of the preform 1. In this case, the core 105 collides with the neck 2 of the preform 1, and receives a downward reaction force.

Since the air pressure of the air cylinder 243 is low, the air cylinder 243 functions as an air cushion, and the elevating member 242 is lowered due to the reaction force. In this case, the sensor 244 that detects the elevating member 242 that is set at the normal elevated position outputs a different signal when the elevating member 242 has been lowered due to supply failure. This makes it possible to detect supply failure. Note that the transfer member 100 on which an unsuccessfully supplied preform 1 is placed, is set at a lowered position at which the push-up member 104 and the core 105 are not inserted into the neck 2 of the preform 1. The first cam follower 106 is guided by another first cam that is positioned lower than the first cam 54 illustrated in FIG. 2, and the lowered position of the push-up member 104 and the core 105 is maintained.

Note that the detection section 240 is not limited to the above structure. It suffices that the detection section 240 be able to determine whether or not the preform 1 is set to the normal inverted state in which the end face of the neck 2 is horizontal (see FIG. 4).

2.2. Unsuccessfully Supplied Preform Discharge Section

The discharge section 250 disposed along the transfer path 40 on the downstream side of the detection section 240 (see FIG. 5) is driven based on a signal output from the sensor 244. As illustrated in FIG. 5, the discharge section 250 includes a stationary plate 251 that is secured over the first star wheel 200. The discharge section 250 also includes an air cylinder 253 that is connected to the stationary plate 251 through a first hinge 252, and a push bar 255 that is connected at one end to the stationary plate 251 through a second hinge 254. The air cylinder 253 is configured so that a cylinder 253A is connected to the first hinge 252, and the end of a rod 253B is connected to the other end of the push bar 255 through a third hinge 256.

When the rod 253B is moved forward, the push bar 255 is rotated around the second hinge 254 to intersect the transfer path 40 (see the broken line in FIG. 5). The travel path of an unsuccessfully supplied preform 1 is thus blocked by the push bar 255, so that the unsuccessfully supplied preform 1 is discharged from the transfer path 40. When the rod 253B is moved backward, a normally supplied preform 1 can pass through the discharge section 250 since the push bar 255 does not intersect the transfer path 40 (see the solid line in FIG. 5).

Note that the transfer member 100 is set to the state illustrated in FIG. 4 when the transfer member 100 passes through the discharge section 250 illustrated in FIG. 5. Specifically, the push-up member 104 and the core 105 are lowered when the transfer member 100 passes through the discharge section 250. Therefore, the preform 1 that has interfered with the push bar 255 is easily removed from the transfer path 40.

In the second embodiment, since the first cam follower 106 is shared by two transfer members 100 (see FIGS. 2 and 3), the detection section 240 detects whether or not supply failure has occurred in at least one of the two transfer members 100. The discharge section 250 discharges two preforms 1 placed on the two transfer members 100, for which it has been determined that supply failure has occurred, to the outside of the system.

2.3. Molded Article Resupply Section

The molded article resupply section 260 is described below with reference to FIGS. 9 to 11. As illustrated in FIG. 9, the neck crystallization system 10B may include the resupply section 260 that resupplies a new preform 1 to the transfer member 100 (omitted in FIG. 9) from which the preform 1 has been discharged by the discharge section 250 at a position between the discharge section 250 and the plurality of heating sections 50. The resupply section 260 includes a transfer arm 270 that transfers a new preform 1 to the transfer member 100 positioned in the transfer path 40, a circulation transfer section 280 that circulates (transfers) the transfer arm 270 at the same speed as the transfer speed of the transfer member 100, and a replenishment section 290 that replenishes a new molded article 1 to the transfer arm 270 that is circulated by the circulation transfer section 280.

The molded article resupply section 260 can thus resupply a new preform 1 to an empty transfer member 100 in place of an unsuccessfully supplied preform 1 that has been discharged by the discharge section 250. In particular, since the transfer arm 270 is circulated at the same speed as the transfer member 100 that is transferred continuously, it is possible to provide a time sufficient for the transfer member 100 to receive and hold a new preform 1.

The replenishment section 290 includes a tilted transfer path 291 that transfers the resupply target preforms 1 in an aligned state, and allows the preform 1 to descend due to its weight, a horizontal transfer path 292 that is provided at the exit end, and a stop member 293 that stops the movement of the preform 1 at the exit end.

Figure 10:
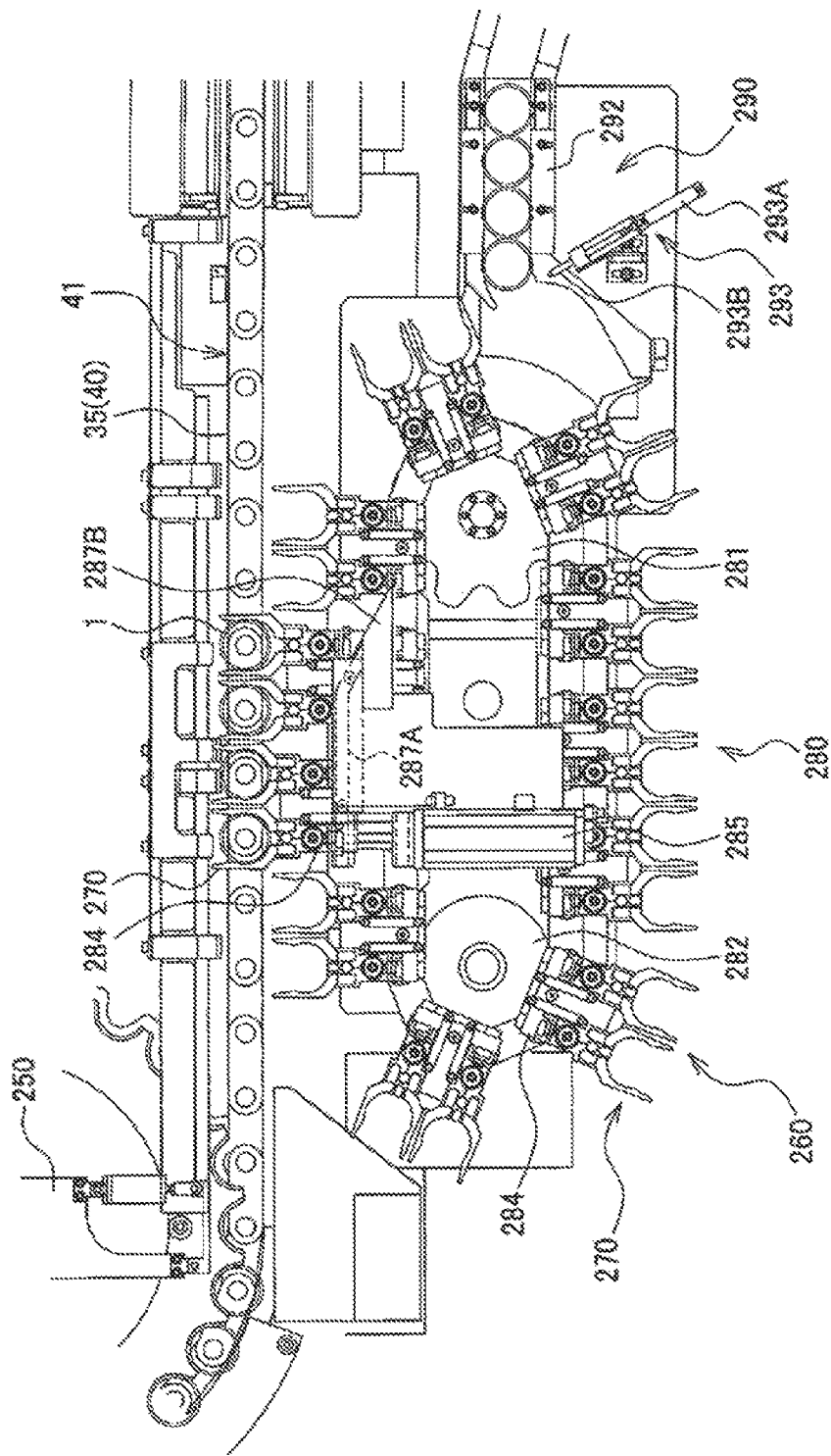
FIG. 10 is a plan view illustrating a molded article resupply section.

As illustrated in FIG. 10, the stop member 293 includes an air cylinder 293A and a stopper pin 293B (rod), and stops the aligned preforms 1 in the horizontal transfer path 292 by advancing the stopper pin 293B. When the stopper pin 293B is retracted, the preform 1 is supplied one by one from the exit end due to the load applied in the alignment direction.

Figure 11:
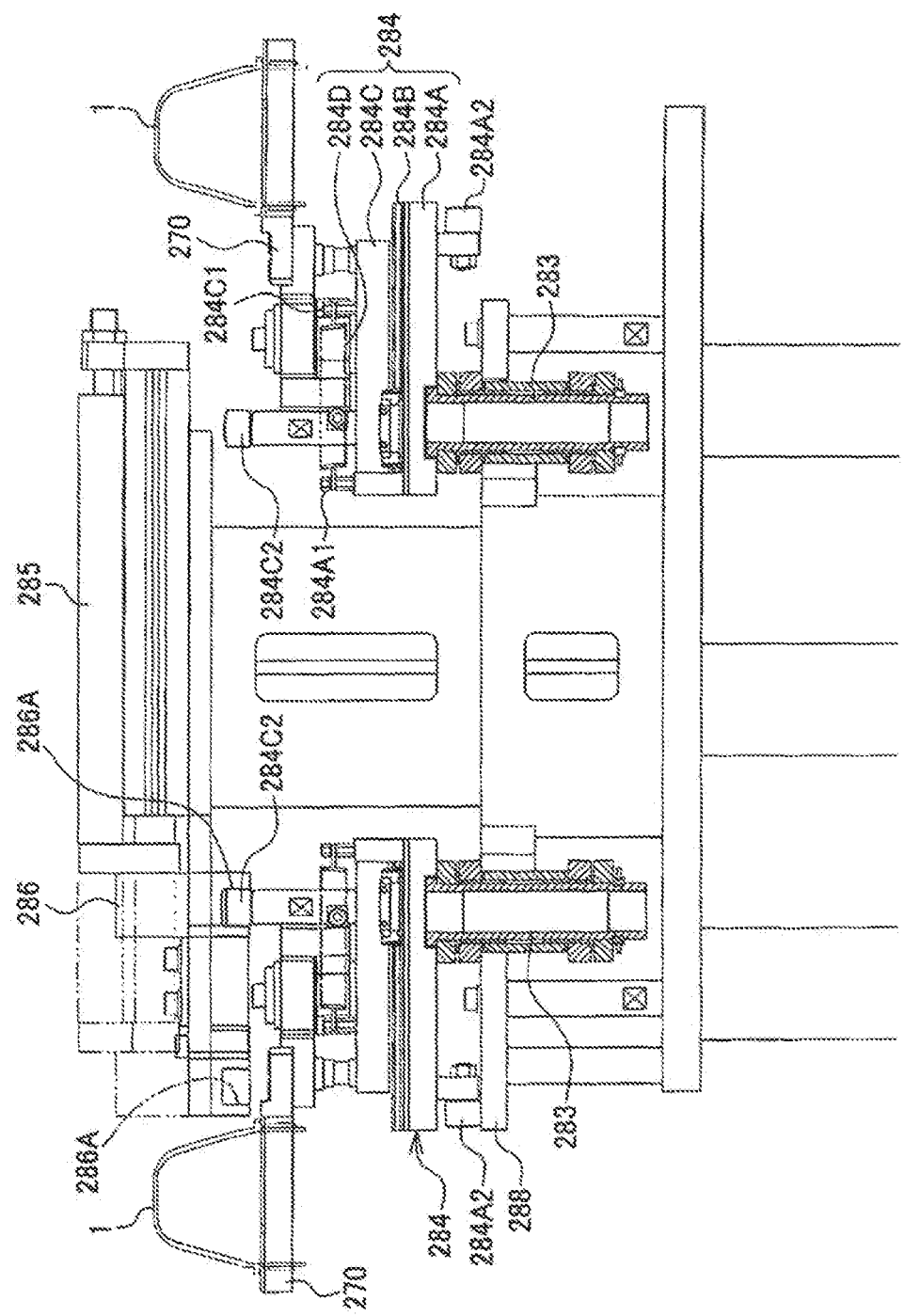
FIG. 11 is a side view illustrating a molded article resupply section.

As illustrated in FIGS. 10 and 11, the circulation transfer section 280 includes a drive sprocket 281, and a chain 283 that is fitted around a driven sprocket 282. A track-like path of the chain 283 is thus formed in a plan view (when viewed from above) (see FIG. 10), and forms a linear transfer path that is parallel to the first linear transfer path 41 of the neck crystallization system 10B.

As illustrated in FIG. 11, a transfer stage 284 is secured on the chain 283. The transfer stage 284 includes a base 284A that is secured on the chain 283, a rail 284B that is provided to the base 284A, a movable stage 284C that can slide along the rail 284B, and a spring 284D that biases the movable stage 284C to the retracted position. The spring 284D is suspended between a pin 284A1 that is provided upright on the base 284A and a pin 284C1 that is provided upright on the movable stage 284C. A cam follower 284A2 is provided on the back side of the base 284A, and comes in rolling contact with a cam surface 288 of the circulation transfer section 280. A cam follower 284C2 is provided upright on the movable stage 284C, and is guided when the movable stage 284C is set at the advance position.

As illustrated in FIGS. 10 and 11, the circulation transfer section 280 includes an air cylinder 285. As illustrated in FIG. 11, a movable section 286 is secured on the rod of the air cylinder 285, the movable section 286 having a groove 286A that engages the cam follower 284C2 of the transfer stage 284. The movable section 286 moves between the position indicated by the solid line and the position indicated by the dot-dash line in FIG. 11.

FIG. 10 illustrates a state in which a new preform 1 is transferred to four transfer members 100. The cam follower 284C2 of the transfer stage 284 engages the groove 286A of the movable section 286 (see FIG. 11) in a state in which the transfer stage 284 has been transferred to the position opposite to the air cylinder 285. In this case, the air cylinder 285 is not driven when the detection section 240 has not detected supply failure. Therefore, the cam follower 284C2 of the transfer stage 284 passes through the groove 286A of the movable section 286, and is circulated. The air cylinder 285 is driven when the detection section 240 has detected supply failure, and the movable section 286 and the cam follower 284C2 advance to the position indicated by the dot-dash line in FIG. 11. Therefore, the transfer arm 270 of the transfer stage 284 (movable stage 284C) that has advanced reaches a position over the transfer path 40 (see FIG. 10).

The cam follower 284C2 of the transfer stage 284 (movable stage 284C) that has been advanced by the air cylinder 285 is guided by a cam groove 287A or a cam surface 287B illustrated in FIG. 10 when the transfer stage 284 is transferred by the chain 283, so that the advance position is maintained. When the preform 1 has been transferred to the transfer member 100 positioned in the transfer path 40, the cam surface 287B is tilted, so that the transfer stage 284 (movable stage 284C) is returned to the retracted position due to the biasing force applied by the spring 284D. The replenishment section 290 supplies the preform 1 that has been released by the stop member 293 to the empty transfer arm 270.

Figure 12A:
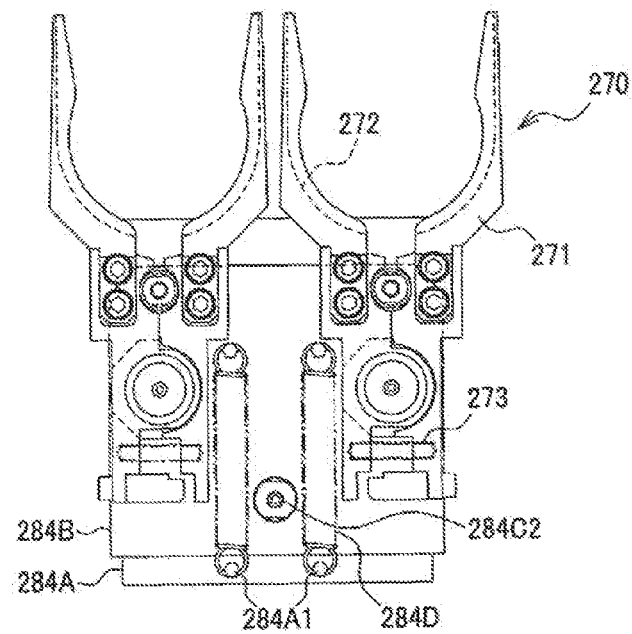
FIGS. 12A and 12B are views illustrating the closed state and the open state of a transfer arm.
Figure 12B:
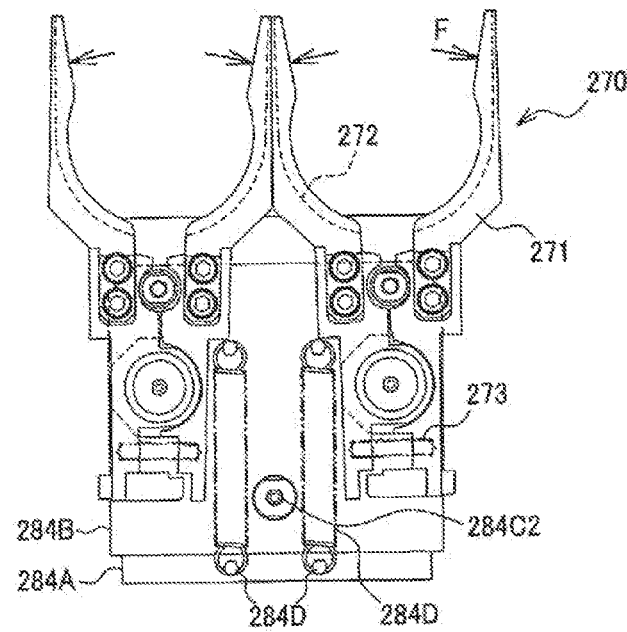

As illustrated in FIGS. 12A and 12B, the transfer arm 270 includes a pair of arm elements 271 and 272 that can be opened and closed. A spring 273 is provided on the rear end of the pair of arm elements 271 and 272. The spring 273 biases the pair of arm elements 271 and 272 to close the pair of arm elements 271 and 272. FIG. 12A illustrates the pair of arm elements 271 and 272 in the closed state. The flange 4 is placed on the pair of arm elements 271 and 272 in the closed state, so that the preform 1 is supported in the inverted state. The preform 1 is thus supported by the transfer arm 270, and resupplied to a position that is located above and opposite to the empty transfer member 100.

As illustrated in FIG. 12B, the pair of arm elements 271 and 272 are opened when an external force F that opens the pair of arm elements 271 and 272 has been applied. The external force F is applied as described below. When the transfer arm 270 has disposed the preform 1 at a position that is located above and opposite to the empty transfer member 100, the push-up member 104 and the core 105 of the transfer member 100 are moved upward, and disposed inside the neck 2 of the preform 1. When the transfer arm 270 has been retracted, the external force F is applied to the pair of arm elements 271 and 272 due to the preform 1, so that the pair of arm elements 271 and 272 are opened. The transfer arm 270 is thus removed from the preform 1.

2.4. Drive Source Common to Drive Sprocket and Star Wheel

Figure 13:
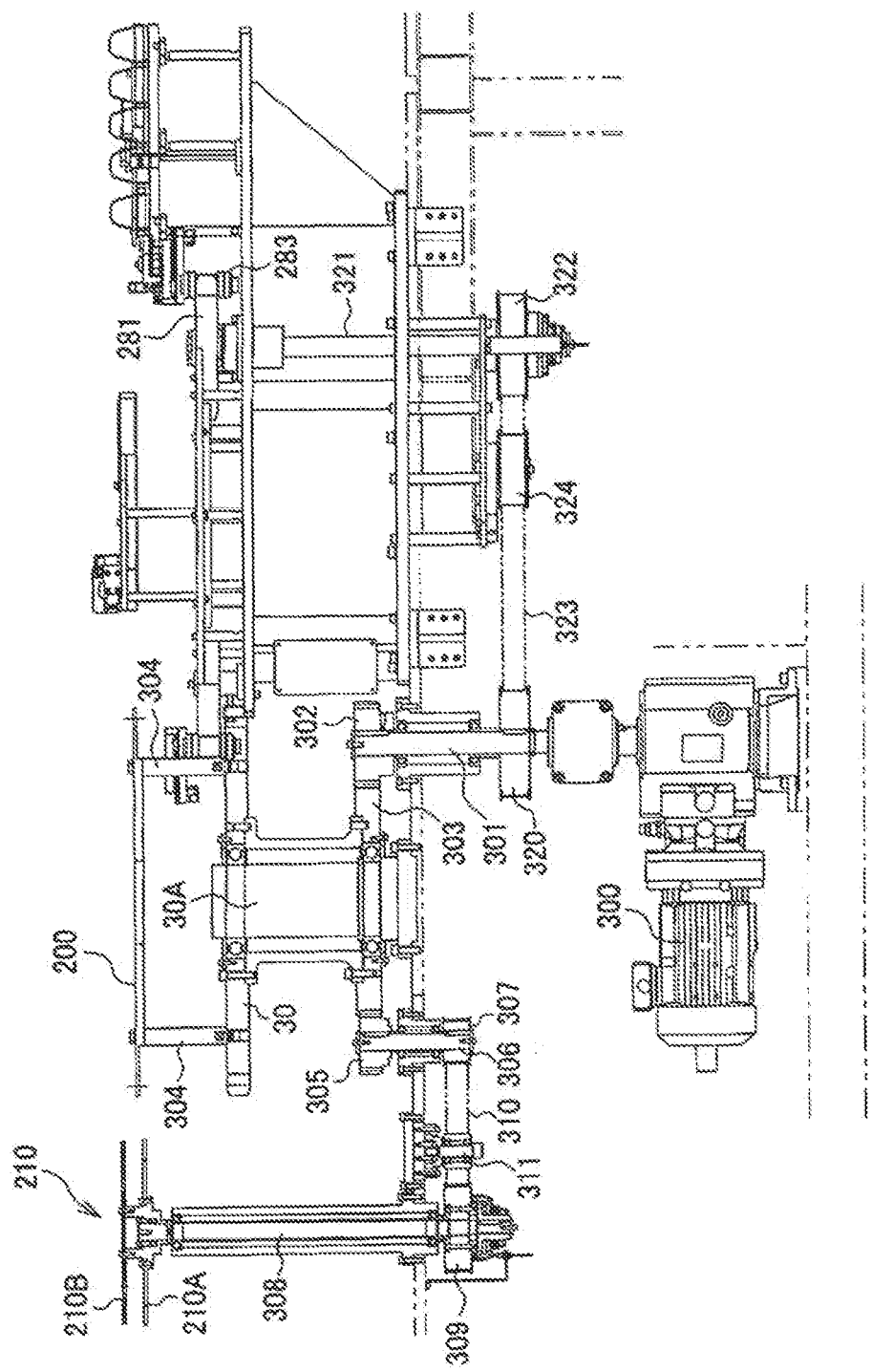
FIG. 13 is a front view illustrating a common drive source and a power transmission mechanism.
Figure 14:
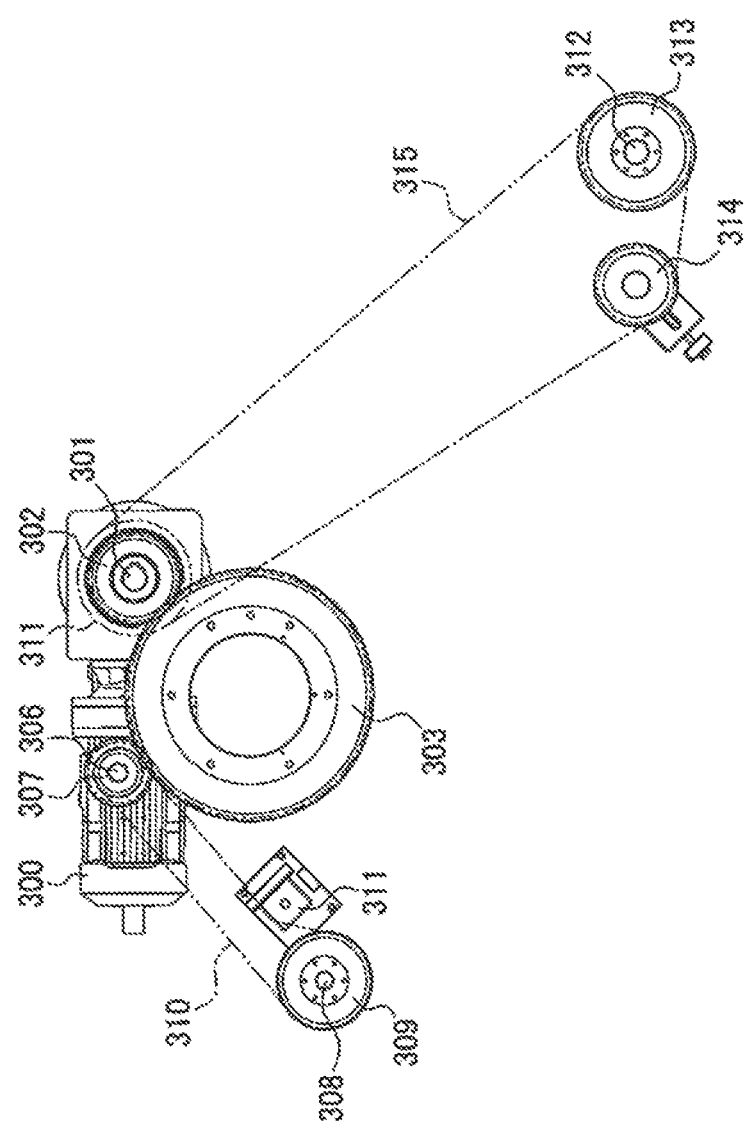
FIG. 14 is a plan view illustrating part of the power transmission mechanism illustrated in FIG. 13.

As illustrated in FIG. 13, the drive sprocket 30, the drive sprocket 281, the first star wheel 200, and the second star wheel 210 are driven using a single drive source (e.g., motor 300). FIG. 14 illustrates members among the members illustrated in FIG. 13 that form a system that transmits the rotational force from the motor 300.

As illustrated in FIGS. 13 and 14, a first gear 302 is secured on an output shaft 301 of a motor 300. The first gear 302 engages a second gear 303 that is concentric (or coaxial) with the drive sprocket 30 and the first star wheel 200. Note that the second gear 303 is rotatably supported by a center shaft 30A of the drive sprocket 30 together with the drive sprocket 30. A plurality of support shafts 304 are provided upright on the drive sprocket 30, and the first star wheel 200 is secured on the plurality of support shafts 304.

As illustrated in FIG. 13, the second gear 303 engages a third gear 305, and a first pulley 307 is secured on a shaft 306 of the third gear 305. A second pulley 309 is provided to a shaft 308 of the second star wheel 210. A belt 310 is fitted around the first pulley 307 and the second pulley 309. A device 311 that adjusts the tension of the belt 310 may be provided.

The above configuration makes it possible to use the motor 300 as a drive source common to the drive sprocket 30, the first star wheel 200, and the second star wheel 210 used in the first embodiment and the second embodiment. It is necessary to rotate the first star wheel 200 and the second star wheel 210 in synchronization in order to supply the preform 1. It is possible to easily ensure synchronized rotation by appropriately setting the gear ratio and the pulley diameter as a result of utilizing the motor 300 as a common drive source.

The third pulley 320 is provided to the output shaft 301 of the motor 300 in order to transmit power to the drive sprocket 281 of the molded article resupply section 260 used in connection with the second embodiment. A fourth pulley 322 is provided to the shaft 321 of the drive sprocket 281. A belt 323 is fitted around the third pulley 320 and the fourth pulley 322. A device 324 that adjusts the tension of the belt 323 may be provided. In the second embodiment, it is necessary to rotate the drive sprockets 30 and 281 in synchronization. It is possible to easily ensure synchronized rotation by appropriately setting the gear ratio and the pulley diameter as a result of utilizing the motor 300 as a common drive source.

3. Third Embodiment

Figure 9:
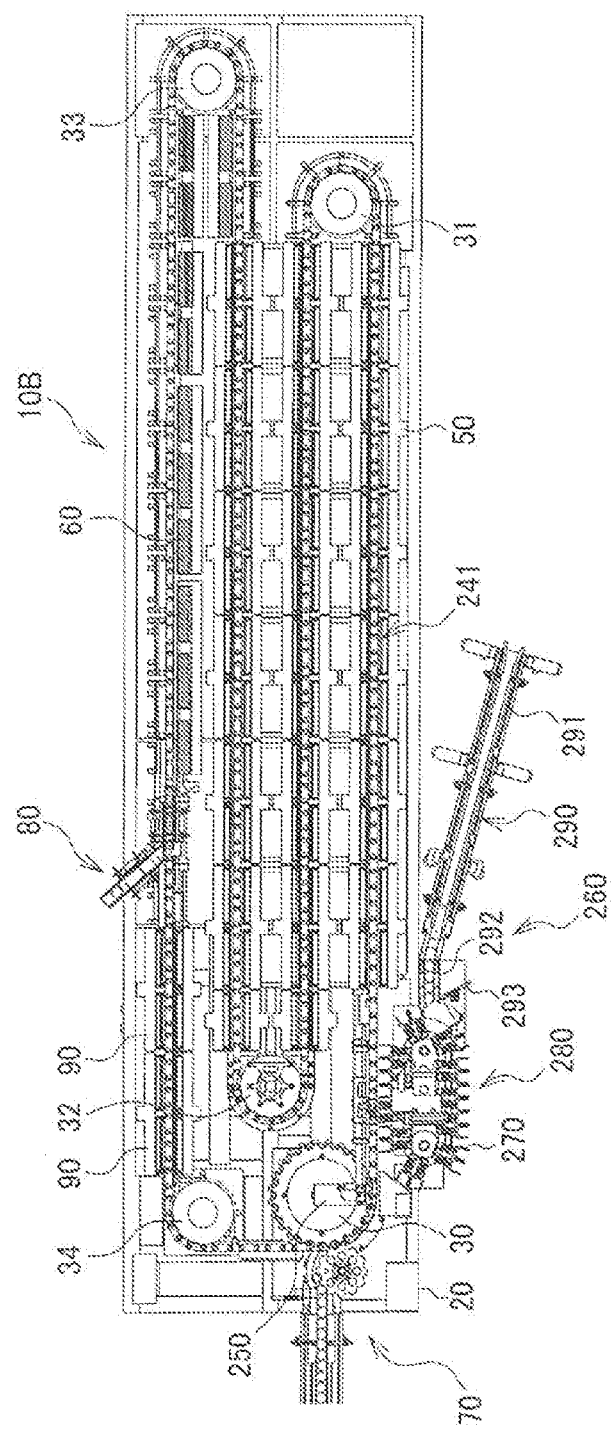
FIG. 9 is a plan view illustrating a neck crystallization system according to a second embodiment of the invention.
Figure 15:
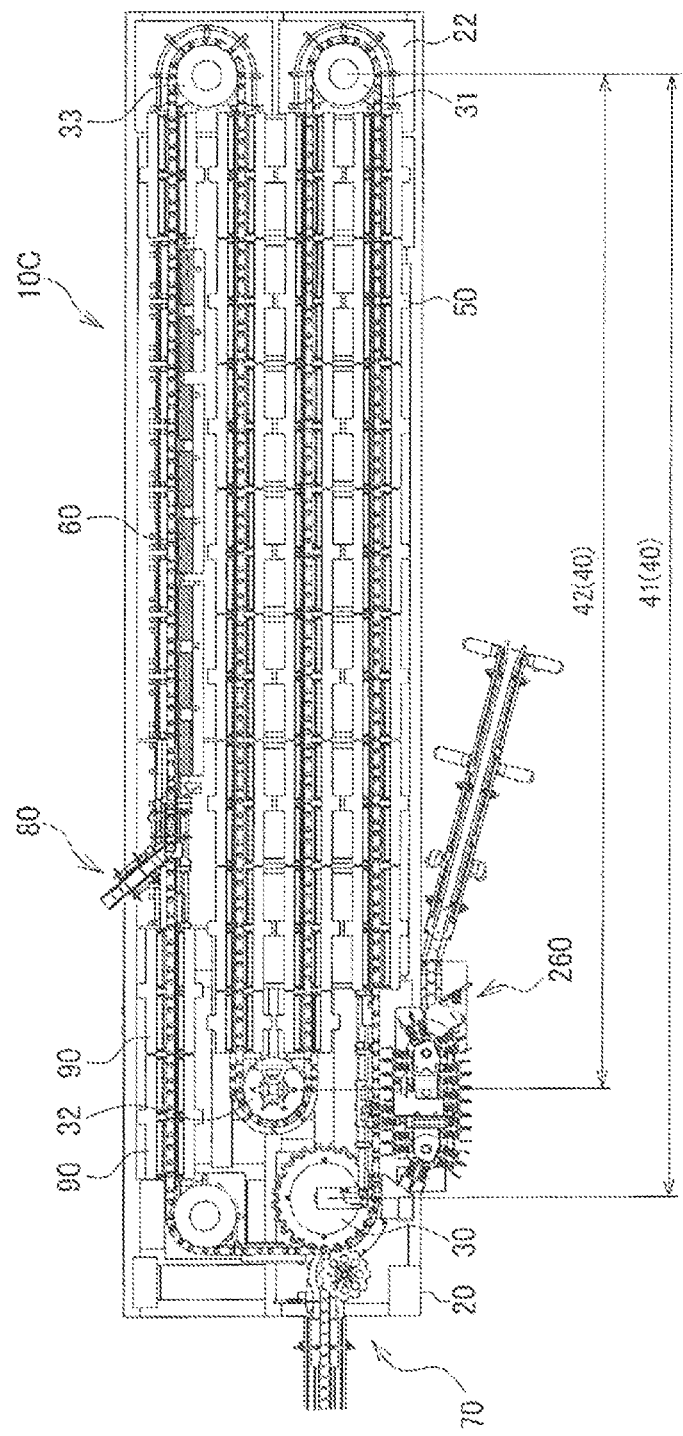
FIG. 15 is a plan view illustrating a neck crystallization system according to a third embodiment of the invention.

FIG. 15 illustrates a neck crystallization system 10C that differs from those illustrated in FIGS. 1 and 9. As illustrated in FIG. 1, the first driven sprocket 31 is mounted on a first mounting section 21 that is provided on the base 20. A second mounting section 22 for the first driven sprocket 31 may also be provided on the base 20. In FIG. 15, the first driven sprocket 31 is mounted on the second mounting section 22. Therefore, the total length of the first linear transfer path 41 and the second linear transfer path 42 illustrated in FIG. 15 is larger than that illustrated in FIG. 1. This makes it possible to increase the number of heating sections 50 that can be disposed along the first linear transfer path 41 and the second linear transfer path 42.

It is necessary to change the length of the heating zone and the cooling zone of the neck crystallization system depending on the diameter of the neck 2 of the preform 1 and the like. It is troublesome to change the constituent members including the stage 10 corresponding to the length of the heating zone and the cooling zone. Moreover, the total number of parts increases due to an increase in the number of parts of each model. According to the third embodiment, since the position of the first driven sprocket 31 can optionally be changed, it is possible to use common parts. It is also possible to provide a plurality of mounting sections for the second driven sprocket 32 and the third driven sprocket 33.

4. Neck Crystallization Method

Figure 16:
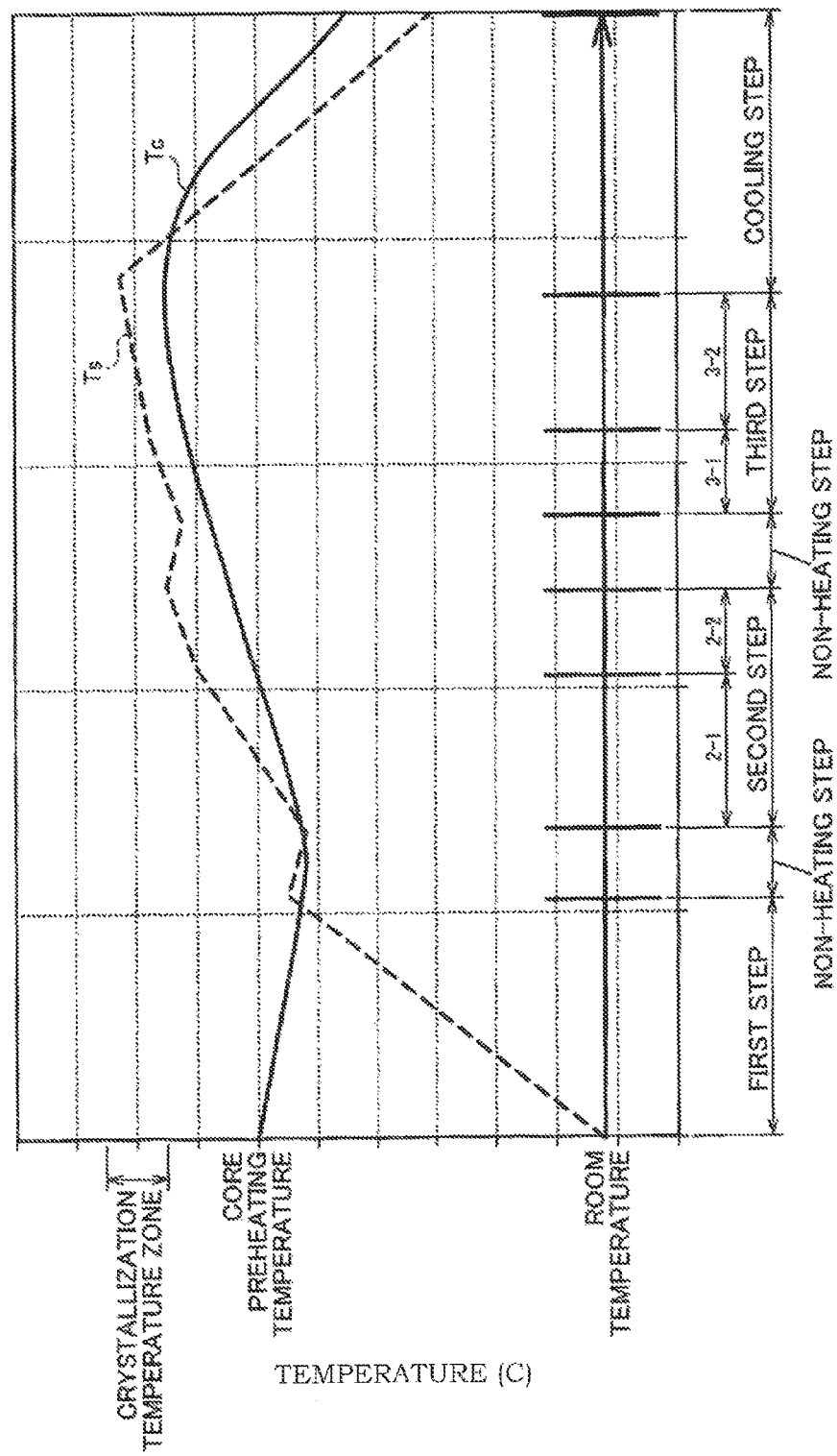
FIG. 16 is a temperature characteristic diagram illustrating an example of a neck crystallization method.

FIG. 16 illustrates a neck crystallization method that is common to the neck crystallization system 10A according to the first embodiment, the neck crystallization system 10B according to the second embodiment, and the neck crystallization system 10C according to the third embodiment. The neck crystallization method is described below in connection with the neck crystallization system 10A according to the first embodiment.

The neck crystallization method includes a heating step and a cooling step. The heating step is divided into first to third steps with a non-heating step interposed therebetween. In the first step, a first power that drives a plurality of heating sections 50 provided along the first linear transfer path 41 illustrated in FIG. 1 is set to 80% of the full power, for example. The surface temperature TS of the neck of the preform (see FIG. 10) increases relatively steeply per unit time.

The heating step may further include the second step that drives a plurality of heating sections 50 provided along the second linear transfer path 42 illustrated in FIG. 1 at a second power that is lower than the first power to heat the neck 2 until the temperature of the neck 2 reaches a crystallization (whitening) temperature zone (e.g., 170 to 190° C.). In the second step illustrated in FIG. 16, the second power that drives the heating sections 50 is set to 60 to 65% of the full power, for example. As illustrated in FIG. 16, the surface temperature TS of the neck of the preform increases less steeply per unit time as compared with the first step. In FIG. 16, the power is set to 65% of the full power in the first stage 2-1 of the second step, and is set to 60% of the full power in the second stage 2-2 of the second step.

The rapid-heating first step and the slow-heating second step are combined in order to reduce the crystallization time while preventing a situation in which the neck 2 is overheated. When using only the first step, the crystallization time can be reduced, but the neck 2 is overheated in the second half of the heating step. When using only the second step, the crystallization temperature can be controlled, but the crystallization time increases. Since the neck 2 of the preform 1 is at room temperature immediately after the preform 1 has been supplied, the crystallization time can be reduced by rapidly heating the neck 2 in the first step up to a temperature lower than the crystallization temperature zone.

As illustrated in FIG. 16, a step that transfers the preform without heating is provided between the first step and the second step. This is because the heating section 50 is not provided around the first driven sprocket 31 disposed between the first linear transfer path 41 and the second linear transfer path 42 illustrated in FIG. 1. The surface temperature TS of the neck 2 of the preform 1 decreases temporarily due to the non-heating step (see FIG. 16). Therefore, the effect of rapid heating in the first step can be suppressed (reduced) when starting the second step. This makes it possible to cause the surface temperature TS of the neck 2 of the preform 1 to increase less steeply as compared with the first step when starting the second step.

The heating step may further include the third step that drives a plurality of heating sections 50 provided along the third linear transfer path 43 illustrated in FIG. 1 at a third power that is lower than the second power to heat the neck 2 within the crystallization (whitening) temperature zone. In the third step illustrated in FIG. 16, the third power that drives the heating sections 50 is set to 45 to 60% of the full power, for example. In FIG. 16, the power is set to 60% of the full power in the first stage 3-1 of the third step in the same manner as in the step 2-2, and is set to 45% of the full power in the second stage 3-2 of the third step. It is possible to easily maintain the temperature of the neck 2 within the crystallization temperature zone by further reducing the heater power (particularly the stage 3-2) after the temperature of the neck 2 has reached the crystallization temperature zone. This makes it possible to prevent a situation in which the neck 2 is overheated.

It is possible to maintain the temperature of the neck 2 within the crystallization temperature zone by reducing the power on the downstream side in the third step to maintain the temperature increase rate (see FIG. 16), or decrease the temperature increase rate. This makes it possible to prevent a situation in which the neck 2 is overheated in the third step.

As illustrated in FIG. 16, a step that transfers the preform without heating is provided between the second step and the third step. This is because the heating section 50 is not provided around the second driven sprocket 32 disposed between the second linear transfer path 42 and the third linear transfer path 43 illustrated in FIG. 1. The surface temperature TS of the neck 2 of the preform 1 decreases temporarily due to the non-heating step (see FIG. 16). Therefore, the surface temperature TS approaches a core temperature TC described later, so that the difference in temperature between the inner surface and the outer surface of the neck 2 is reduced.

The temperature TC of the core 105 is also illustrated in FIG. 16. FIG. 16 illustrates an example in which the core 105 is preheated in the core preheating section 90 illustrated in FIG. 1 before the core 105 is inserted into the neck 2. Specifically, the neck crystallization method may further include a step that preheats the core 105 before inserting the core 105 into the neck 2. Note that the neck crystallization method need not necessarily include the step that preheats the core 105.

In the first step (see FIG. 16), heat rays (e.g., infrared rays) from the heater 51 of the heating section 50 (FIG. 6) are applied to the core 105 via the neck 2, but the temperature of the core 105 decreases due to contact with the neck 2 that is set at room temperature. In the first step or the subsequent non-heating step (at the start timing of the second step), the temperature of the core 105 is substantially equal to the surface temperature of the neck 2. Specifically, the first step or the subsequent non-heating step is performed until the temperature of the outer surface of the neck 2 becomes substantially equal to the temperature of the inner surface of the neck 2. In the second step, the temperature increase rate of the core 105 is low since the core 105 has a larger heat capacity than that of the neck 2. However, since the temperature TC of the core 105 gradually increases along with an increase in the surface temperature TS of the neck 2 of the preform 1, the difference in temperature between the inner surface and the outer surface of the neck 2 is within a given range. Note that the step that preheats the core 105 is not an essential step, but has an advantage in that the time required for the first step can be reduced by preheating the core 105.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention. Any term cited with a different term having a broader meaning or the same meaning at least once in the specification and the drawings can be replaced by the different term in any place in the specification and the drawings.

Figure 17:
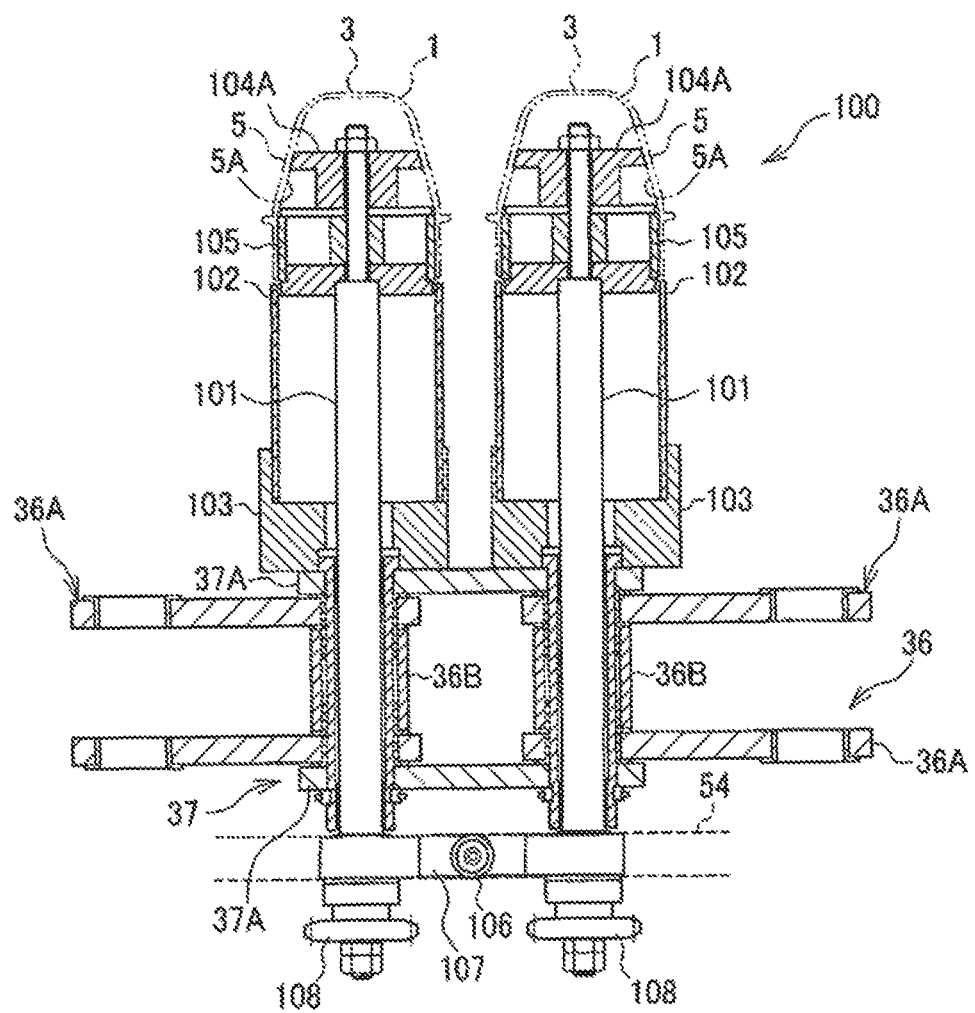
FIG. 17 is a view illustrating a modification of a push-up member.

A push-up member 104A illustrated in FIG. 17 may be used instead of the push-up member 104 illustrated in FIG. 2. The body 3 of the preform 1 has a tapered inner circumferential wall 3A that decreases in diameter toward the bottom 5. The push-up member 104A pushes the tapered inner circumferential wall 3A of the body 5 of the preform 1 instead of the bottom 3 of the preform 1. When the push-up member 104A has come in contact with the inner circumferential wall 3A, the preform 1 is automatically centered due to the push-up member 104a since the inner circumferential wall 3A is tapered. It is possible to stably center and support the preform 1 by utilizing the push-up member 104A illustrated in FIG. 17 as compared with the case of using the push-up member 104 illustrated in FIG. 2. As a result, the distance between the neck 2 of each preform 1 and the heater 51 becomes almost uniform, so that each preform 1 can be uniformly heated. In FIG. 17, the heat shield 110, the second cam follower 111 that drives the heat shield 110, and the second cam 55 are not provided.

The first cam follower 106 may be lowered using the first cam 54 so that the core 105 does not come in contact with the neck 2 of the preform 1 in at least one non-heating zone between a plurality of heating sections 50 disposed along the first linear transfer path 41, the second linear transfer path 42, and the third linear transfer path 43 illustrated in FIG. 1. For example, the heating section 50 indicated by the arrow A in FIG. 1 may be omitted to form a non-heating zone for removing the core 105 from the neck 2 of the preform 1.

If the neck 2 of the preform 1 is continuously heated using the heater 51 in a state in which the core 105 is inserted into the neck 2 (see FIG. 6), an area of the body 3 that is not restricted by the core 105 and is positioned close to the neck 2 may shrink (may be deformed). In order to prevent such a situation, the core 105 is temporarily removed from the neck 2 in at least one non-heating zone between a plurality of heating sections 50. As a result, shrinkage (deformation) is diffused without being concentrated in an area of the body 3 that is positioned close to the neck 2. Since the core 105 is inserted into the neck 2 again, shrinkage of the neck 2 is corrected. This makes it possible to suppress concentrated shrinkage (deformation) of the body 3.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A neck crystallization system comprising:
   a rectangular stage that has long sides and short sides in a plan view;
   a plurality of sprockets that are disposed on the stage;
   an endless member that is horizontally fitted around the plurality of sprockets;
   a transfer path that is formed in an area in which the endless member is disposed, and includes first to fourth linear transfer paths, the first to fourth linear transfer paths being parallel to each other, and extending in a direction along the long sides, transfer directions of two transfer paths among the first to fourth linear transfer paths that are adjacent to each other in a direction along the short sides being opposite to each other;
   a plurality of transfer members that are mounted on the endless member, and respectively support and transfer a molded article having a neck along the transfer path;
   a plurality of heating sections that are provided along at least the first to third linear transfer paths among the first to fourth linear transfer paths that are positioned on an upstream side, and heat the neck of the molded article;
   a cooling section that is disposed along at least the fourth linear transfer path that is positioned on a downstream side of the plurality of heating sections, and cools the neck of the molded article;
   a molded article supply section that supplies at least one molded article to at least one transfer member that is situated in the transfer path at a position on an upstream side of the plurality of heating sections; and
   a molded article removal section that removes at least one molded article from at least one transfer member that is situated in the transfer path at a position between the cooling section and the molded article supply section,
   the plurality of sprockets including one drive sprocket and first to fourth driven sprockets,
   the drive sprocket being disposed on an upstream-side end of the first linear transfer path,
   the first driven sprocket being disposed on a downstream-side end of the first linear transfer path and an upstream-side end of the second linear transfer path,
   the second driven sprocket being disposed on a downstream-side end of the second linear transfer path and an upstream-side end of the third linear transfer path,
   the third driven sprocket being disposed on a downstream-side end of the third linear transfer path and an upstream-side end of the fourth linear transfer path, and
   the fourth driven sprocket being disposed on a downstream-side end of the fourth linear transfer path, when an outer diameter of the drive sprocket is D1, each outer diameter of the first, second and third driven sprockets is D2 and an outer diameter of the fourth driven sprocket is D3, D1>D2≧D3 is satisfied.

2. A neck crystallization system comprising:
a rectangular stage that has long sides and short sides in a plan view;
a plurality of sprockets that are disposed on the stage;
an endless member that is horizontally fitted around the plurality of sprockets;
a transfer path that is formed in an area in which the endless member is disposed, and includes first to fourth linear transfer paths, the first to fourth linear transfer paths being parallel to each other, and extending in a direction along the long sides, transfer directions of two transfer paths among the first to fourth linear transfer paths that are adjacent to each other in a direction along the short sides being opposite to each other;
a plurality of transfer members that are mounted on the endless member, and respectively support and transfer a molded article having a neck along the transfer path;
a plurality of heating sections that are provided along at least the first to third linear transfer paths among the first to fourth linear transfer paths that are positioned on an upstream side, and heat the neck of the molded article;
a cooling section that is disposed along at least the fourth linear transfer path that is positioned on a downstream side of the plurality of heating sections, and cools the neck of the molded article;
a molded article supply section that supplies at least one molded article to at least one transfer member that is situated in the transfer path at a position on an upstream side of the plurality of heating sections; and
a molded article removal section that removes at least one molded article from at least one transfer member that is situated in the transfer path at a position between the cooling section and the molded article supply section,
the plurality of sprockets including one drive sprocket and first to fourth driven sprockets,
the molded article supply section supplying the molded article to the transfer member that is secured on part of the endless member at a position at which part of the endless member engages the drive sprocket,
the molded article supply section including:
a supply star wheel that transfers the molded article supplied from outside; and
a drive source that is shared by the drive sprocket and the supply star wheel.

3. The neck crystallization system as defined in claim 1,
the stage including a mounting section for selectively mounting at least one of the first to third driven sprockets at a different position in a direction parallel to the long sides.

4. A neck crystallization system comprising:
a transfer path,
a plurality of transfer members that respectively support and transfer a molded article having a neck, a body that follows the neck, a flange that separates the neck and the body, and a bottom that closes one end of the body along the transfer path;
a heating section that is provided along the transfer path and heats the neck of the molded article; and
a cooling section that is provided along a downstream side of the heating section, and cools the neck of the molded article,
each of the plurality of transfer members including:
an elevating rod;
a transfer stage that is supported by the endless member, the molded article being placed on the transfer stage in an inverted state in which the neck is positioned on a lower side;
a push-up member that pushes the molded article upward and moves the neck away from the transfer stage, thermally separating the neck from the transfer stage in at least the plurality of heating sections and the cooling section in which the elevating rod is set to an elevated position;
a core that is disposed inside the neck of the molded article in at least the plurality of heating sections and the cooling section in which the elevating rod is set to the elevated position;
a first cam follower that is provided to the elevating rod; and
a rotation sprocket that is provided to the elevating rod, and rotates the molded article in at least the plurality of heating sections in which the elevating rod is set to the elevated position, and
the transfer path including a first cam that guides the first cam follower, and a chain that engages the rotation sprocket.

5. The neck crystallization system as defined in claim 4,
the body of the molded article having a tapered inner circumferential wall that decreases in diameter toward the bottom, and
the push-up member pushing the inner circumferential wall of the molded article upward.

6. The neck crystallization system as defined in claim 4,
the first cam follower being lowered using the first cam so that the core does not come in contact with the neck of the molded article in at least one non-heating zone between the plurality of heating sections.

7. The neck crystallization system as defined in claim 4,
each of the plurality of transfer members further including:
a tubular heat shield that is supported by an elevating member that can be moved upward and downward relative to the elevating rod, and surrounds the body of the molded article in at least the plurality of heating sections in which the elevating rod is set to the elevated position; and
a second cam follower that is connected to the heat shield, and
the transfer path further including a second cam that guides the second cam follower.

8. The neck crystallization system as defined in claim 4, further comprising:
a core preheating section that is disposed along the transfer path at a position between the molded article removal section and the molded article supply section, and preheats the core of the plurality of transfer members.

9. The neck crystallization system as defined in claim 2, further comprising:
a first star wheel that is disposed concentrically with the drive sprocket, and rotates the molded article to transfer the molded article to the transfer member,
wherein the supply star wheel transfers the molded article supplied from outside to the first star wheel, and
the drive source is shared by the drive sprocket, the first star wheel, and the supply star wheel.

10. The neck crystallization system as defined in claim 9, further comprising:
a detection section that detects placement failure of the molded article that is placed on a transfer stage of the transfer member by the first star wheel; and a discharge section that is disposed along the transfer path on a downstream side of the detection section, and discharges the molded article for which placement failure has been detected by the detection section from the transfer path.

11. The neck crystallization system as defined in claim 10, further comprising:

a resupply section that resupplies a new molded article to the transfer member from which the molded article has been discharged by the discharge section at a position between the discharge section and the plurality of heating sections.

12. The neck crystallization system as defined in claim 4, the chain being a stationary chain.

13. The neck crystallization system as defined in claim 4, wherein the thermal separation of the neck from the transfer stage contributes to uniform heating of the molded article.

* * * * *